US012592025B2

(12) United States Patent
Li et al.

(10) Patent No.: US 12,592,025 B2
(45) Date of Patent: Mar. 31, 2026

(54) IMAGE RENDERING BASED ON LIGHT BAKING

(71) Applicant: Tencent Technology (Shenzhen) Company Limited, Shenzhen (CN)

(72) Inventors: Chao Li, Shenzhen (CN); Yuanheng Li, Shenzhen (CN); Lan Gao, Shenzhen (CN); Nan Wei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 229 days.

(21) Appl. No.: 18/379,893

(22) Filed: Oct. 13, 2023

(65) Prior Publication Data

US 2024/0054721 A1 Feb. 15, 2024

Related U.S. Application Data

(63) Continuation of application No. PCT/CN2022/133891, filed on Nov. 24, 2022.

(30) Foreign Application Priority Data

Mar. 2, 2022 (CN) .......................... 202210202410.9

(51) Int. Cl.
*G06T 15/50* (2011.01)
*G06T 5/20* (2006.01)
(Continued)

(52) U.S. Cl.
CPC .............. *G06T 15/506* (2013.01); *G06T 5/20* (2013.01); *G06T 15/04* (2013.01); *G06T 15/06* (2013.01)

(58) Field of Classification Search
None
See application file for complete search history.

(56) References Cited

U.S. PATENT DOCUMENTS

2022/0036640 A1 2/2022 Vorba
2022/0284657 A1* 9/2022 Müller ................... G06N 3/084

FOREIGN PATENT DOCUMENTS

CN 111161384 A 5/2020
CN 113034657 A 6/2021

OTHER PUBLICATIONS

Müller, Thomas, Markus Gross, and Jan Novák. "Practical path guiding for efficient light-transport simulation." Computer Graphics Forum. vol. 36. No. 4. 2017 (Year: 2017).*

(Continued)

*Primary Examiner* — Nurun Flora
(74) *Attorney, Agent, or Firm* — Banner & Witcoff, Ltd.

(57) ABSTRACT

This application describes a rendering method and apparatus, a device, and a storage medium. The method comprises: determining a texture element in a to-be-rendered scene, and determining a target spatial directional tree corresponding to the to-be-rendered scene. The target spatial directional tree represents an incident ray distribution corresponding to the texture element in the to-be-rendered scene. The method further comprises determining, based on the target spatial directional tree, a scene spatial region for the texture element, determining the incident ray distribution corresponding to the texture element based on a quantity of light paths and light energy in the scene spatial region; and determining a light rendering result corresponding to the texture element based on an incident ray corresponding to the incident ray distribution.

20 Claims, 16 Drawing Sheets

(51) Int. Cl.
  *G06T 15/04* (2011.01)
  *G06T 15/06* (2011.01)

(56) References Cited

OTHER PUBLICATIONS

Jan. 9, 2023—(WO) International Search Report and Written Opinion—App PCT/CN2022/133891.

Muller, T. et al., "Practical path guiding for efficient light-transport simulation", Computer Graphics Forum,vol. 36, No. 4, Dec. 31, 2017 (Dec. 31, 2017), abstract, and sections 1-3.

Silvennoinen A, Sloan P P. Ray Guiding for Production Lightmap Baking[M]//SIGGRAPH Asia 2019 Technical Briefs. 2019: 91-94.

Vorba J, Hanika J, Herholz S, et al. Path guiding in production[M]// ACM SIGGRAPH 2019 Courses. 2019: 1-77.

Ruppert L, Herholz S, Lensch H P A. Robust fitting of parallax-aware mixtures for path guiding[J]. ACM Transactions on Graphics (TOG), 2020, 39(4): 147: 1-147: 15.

* cited by examiner

20a

| Baking tool | |
|---|---|
| ◿ Two-dimensional lightmap | |
|     Enable | ☑ |
|     Samples per pixel | a1   ▨ |
|     Max bounces | a2   ▨ |
|     Denoiser mode | Disable ▽ |
|     Enable path guiding | ☑ |
| | |
| ◿ Lightmap path guiding | |
|     Base samples per iteration | a3   ▨ |
|     Max bounces | a4   ▨ |
|     Multi important sampling fraction | a5   ▨ |
|     Build iterations | a6   ▨ |
|     Max Dtree depth | a7   ▨ |
|     Dtree threshold | a8   ▨ |
|     SDtree max memory | a9   ▨ |
|     Stree threshold | a10   ▨ |

FIG. 2

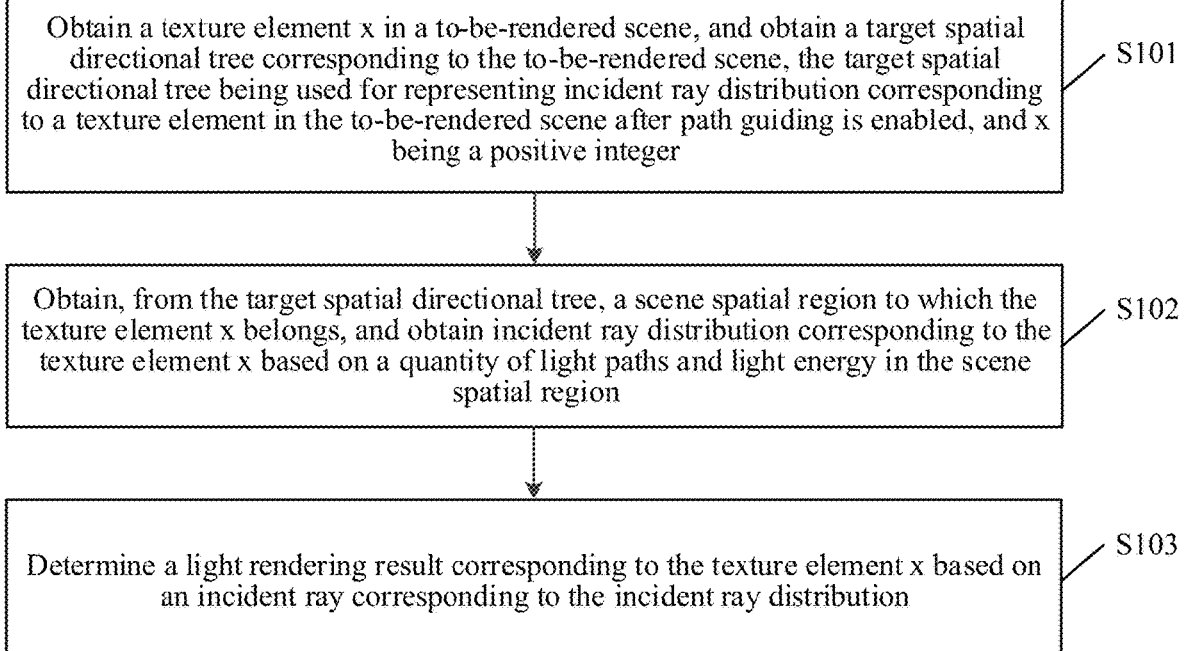

Obtain a texture element x in a to-be-rendered scene, and obtain a target spatial directional tree corresponding to the to-be-rendered scene, the target spatial directional tree being used for representing incident ray distribution corresponding to a texture element in the to-be-rendered scene after path guiding is enabled, and x being a positive integer — S101

Obtain, from the target spatial directional tree, a scene spatial region to which the texture element x belongs, and obtain incident ray distribution corresponding to the texture element x based on a quantity of light paths and light energy in the scene spatial region — S102

Determine a light rendering result corresponding to the texture element x based on an incident ray corresponding to the incident ray distribution — S103

FIG. 4

$L\,(x,\,\omega_i)$

X

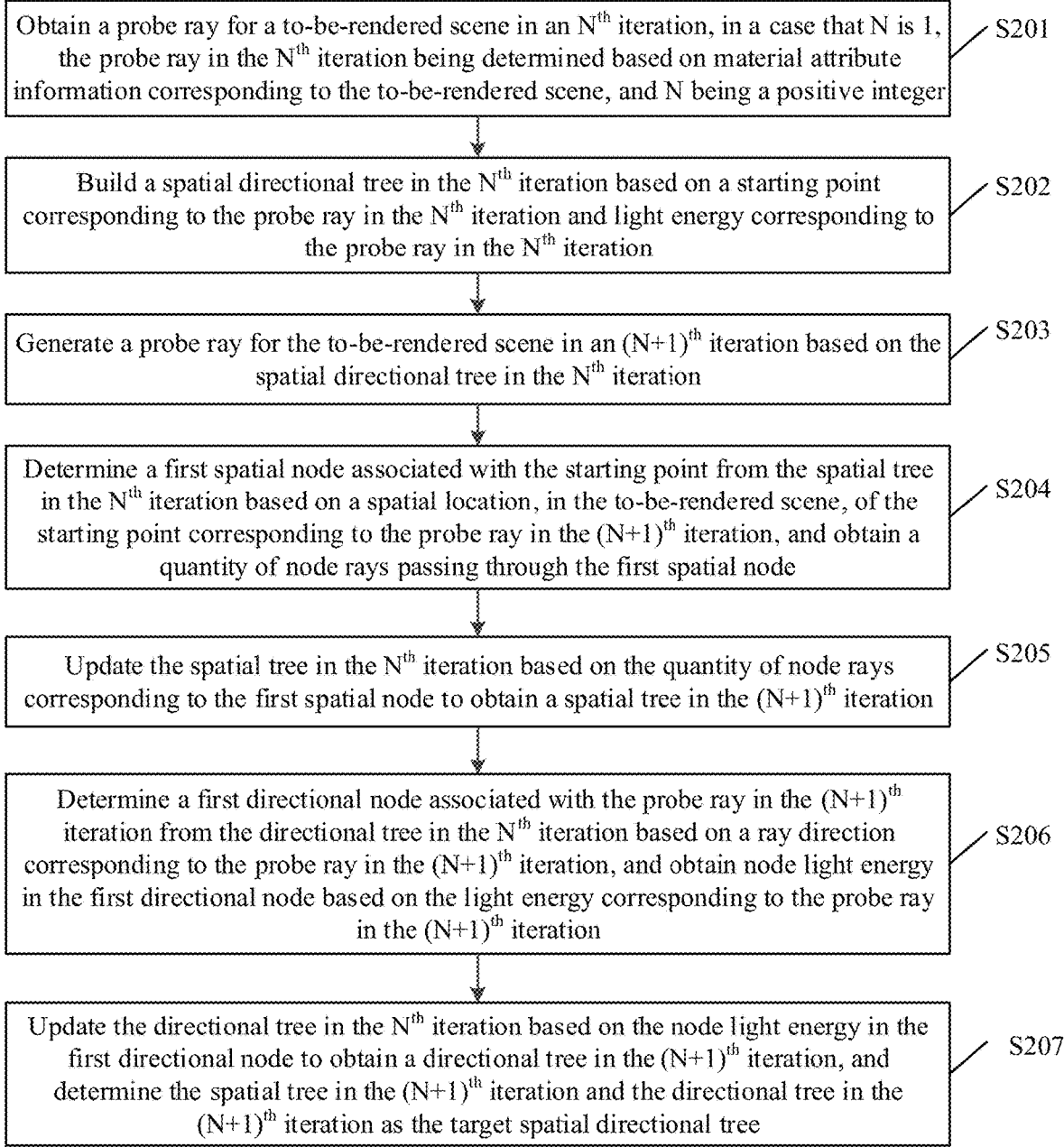

Obtain a probe ray for a to-be-rendered scene in an N$^{th}$ iteration, in a case that N is 1, the probe ray in the N$^{th}$ iteration being determined based on material attribute information corresponding to the to-be-rendered scene, and N being a positive integer — S201

Build a spatial directional tree in the N$^{th}$ iteration based on a starting point corresponding to the probe ray in the N$^{th}$ iteration and light energy corresponding to the probe ray in the N$^{th}$ iteration — S202

Generate a probe ray for the to-be-rendered scene in an (N+1)$^{th}$ iteration based on the spatial directional tree in the N$^{th}$ iteration — S203

Determine a first spatial node associated with the starting point from the spatial tree in the N$^{th}$ iteration based on a spatial location, in the to-be-rendered scene, of the starting point corresponding to the probe ray in the (N+1)$^{th}$ iteration, and obtain a quantity of node rays passing through the first spatial node — S204

Update the spatial tree in the N$^{th}$ iteration based on the quantity of node rays corresponding to the first spatial node to obtain a spatial tree in the (N+1)$^{th}$ iteration — S205

Determine a first directional node associated with the probe ray in the (N+1)$^{th}$ iteration from the directional tree in the N$^{th}$ iteration based on a ray direction corresponding to the probe ray in the (N+1)$^{th}$ iteration, and obtain node light energy in the first directional node based on the light energy corresponding to the probe ray in the (N+1)$^{th}$ iteration — S206

Update the directional tree in the N$^{th}$ iteration based on the node light energy in the first directional node to obtain a directional tree in the (N+1)$^{th}$ iteration, and determine the spatial tree in the (N+1)$^{th}$ iteration and the directional tree in the (N+1)$^{th}$ iteration as the target spatial directional tree — S207

FIG. 6

IMAGE RENDERING BASED ON LIGHT BAKING

CROSS-REFERENCE TO RELATED APPLICATIONS

This application is a continuation of, and claims priority to PCT/CN2022/133891, filed Nov. 24, 2022, which in turn claims priority to Chinese Patent Application No. 202210202410.9, entitled "RENDERING METHOD AND APPARATUS, DEVICE, AND MEDIUM" filed with the China National Intellectual Property Administration on Mar. 2, 2022, each of which is incorporated by reference in its entirety.

FIELD OF THE TECHNOLOGY

This application relates to the field of rendering technologies, and in particular, to a rendering method and apparatus, a device, and a storage medium.

BACKGROUND OF THE DISCLOSURE

During game development, a developer needs to render objects (for example, virtual characters and scenes) in the game. Using real light during game development is time-consuming. Therefore, direct illumination and indirect illumination in a scene may usually be predicted offline through light baking and stored in a form of a lightmap, so that objects in the game can be rendered by using the lightmap.

SUMMARY

The present application describes a rendering method, which may include the following steps:
determining a texture element in a to-be-rendered scene, and determining a target spatial directional tree corresponding to the to-be-rendered scene, wherein the target spatial directional tree represents an incident ray distribution corresponding to the texture element in the to-be-rendered scene;
determining, based on the target spatial directional tree, a scene spatial region for the texture element, and determining the incident ray distribution corresponding to the texture element based on a quantity of light paths and light energy in the scene spatial region; and
determining a light rendering result corresponding to the texture element based on an incident ray corresponding to the incident ray distribution.
The application also provides a rendering apparatus, including: one or more processors; and memory storing instructions that, when executed by the one or more processors, configure the apparatus to:
determine a texture element in a to-be-rendered scene;
determine a target spatial directional tree corresponding to the to-be-rendered scene, wherein the target spatial directional tree represents an incident ray distribution corresponding to the texture element in the to-be-rendered scene;
determine, based on the target spatial directional tree, a scene spatial region for the texture element;
determine the incident ray distribution corresponding to the texture element based on a quantity of light paths and light energy in the scene spatial region; and
determine a light rendering result corresponding to the texture element based on an incident ray corresponding to the incident ray distribution.

The application also provides a computer device, including a memory and a processor, the memory being connected to the processor, the memory being configured to store a computer program, and the processor being configured to invoke the computer program, so that the computer device performs the method provided in the examples of this application.

This application also provides a non-transitory computer-readable storage medium, the non-transitory computer-readable storage medium storing a computer program, and the computer program being suitable for being loaded and executed by a processor, so that a computer device having the processor performs the method provided in the examples of this application.

This application also provides a computer program product or a computer program, the computer program product or the computer program including computer instructions, and the computer instructions being stored in a computer-readable storage medium. A processor of a computer device reads the computer instructions from the computer-readable storage medium, and the processor executes the computer instructions, so that the computer device performs the method provided in the examples of this application.

BRIEF DESCRIPTION OF THE DRAWINGS

To describe the technical solutions of this application, the following briefly describes the accompanying drawings. Apparently, the accompanying drawings in the following description show only some examples of this application, and a person of ordinary skill in the art may still derive other drawings from these accompanying drawings without creative efforts.

FIG. 2 is a schematic diagram of a parameter configuration interface of a light baking tool.

FIG. 4 is a schematic flowchart of a rendering method.

FIG. 6 is a schematic flowchart of building a spatial directional tree.

DESCRIPTION OF EMBODIMENTS

The technical solutions of this application are clearly and completely described in the following with reference to the accompanying drawings. Apparently, the described examples are merely some rather than all of the examples of this application. All other examples obtained by a person of ordinary skill in the art based on the examples of this application without making creative efforts shall fall within the protection scope of this application.

For ease of subsequent description, related technologies used in this application are briefly described below.

Light baking: Use of real light during game development is time-consuming. Therefore, direct illumination and indirect illumination in a scene may usually be predicted offline and stored in a form of a lightmap. This process may be referred to as light baking. The stored lightmaps may be used for rendering objects in the game (for example, virtual characters and scenes in the game).

Global illumination (GI): also referred to as indirect illumination. Global illumination is a rendering technology in which both direct light from a light source in a scene and indirect light reflected by another object in the scene are considered. Global illumination can effectively enhance a sense of reality of a scene.

Ray guiding: During light propagation, distribution of sampled rays is recalculated based on global information such as energy distribution of a light source in a scene and an occlusion status of the scene, to reduce a quantity of ineffective sampled rays, reduce a variance of calculation, and speed up algorithm convergence. A case that ray guiding is used in an entire light path for light propagation may be referred to as path guiding.

In a current light baking method, sampled rays may be generated based on a surface material and direct light sampling, and texture elements in a scene may be rendered by using the sampled rays to obtain a light rendering result corresponding to each texture element in the scene. However, in a case that objects blocking each other exist in some complex scenes, sampled rays generated based on a surface material and direct light sampling may include a large quantity of ineffective rays, resulting in low quality of light rendering.

The application describes a rendering method and apparatus, a device, and a medium, to improve rendering quality for a scene.

Figure 1:
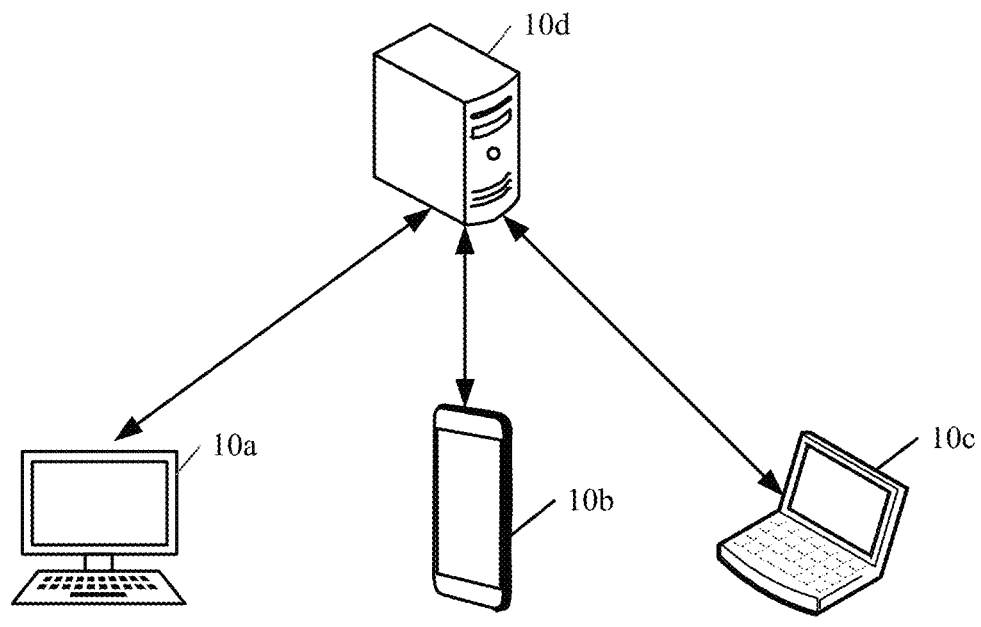
FIG. 1 is a schematic structural diagram of a network architecture.

FIG. 1 is a schematic structural diagram of a network architecture to which a rendering method is applicable. As shown in FIG. 1, the network architecture may include a server 10d and a user terminal cluster. The user terminal cluster may include one or more user terminals. A quantity of user terminals is not limited in this application. As shown in FIG. 1, the user terminal cluster may include a user terminal 10a, a user terminal 10b, a user terminal 10c, and the like. The user terminal in the user terminal cluster may include but is not limited to electronic devices with a light baking function, such as a smartphone, a tablet computer, a laptop computer, a personal digital assistant, a mobile Internet device (MID), a wearable device (for example, a smartwatch or a smart band), a smart home appliance (for example, a smart television), and a vehicle-mounted device. The server 10d may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. As shown in FIG. 1, the user terminal 10a, the user terminal 10b, and the user terminal 10c in the user terminal cluster each may be connected to the server 10d, so that the user terminal can exchange data with the server 10d through a network connection.

A light baking tool may run on the user terminal (for example, the user terminal 10a) shown in FIG. 1. The light baking tool may be used in game development, film and television production, and other scenarios. The light baking tool may be any baking tool that supports a hardware ray tracing graphics processing unit (GPU). A type of the light baking tool is not limited in this application. For example, in a game development stage, simulated illumination for a game scene may be calculated by using the light baking tool on the user terminal 10a to obtain (e.g., determine) a scene illumination result corresponding to the game scene, and the scene illumination result is stored offline in a form of a lightmap. For example, the lightmap generated by the light baking tool may be stored in a local database of the user terminal 10a. The lightmap stored in the local database may be directly invoked to render objects in each game scene to improve rendering efficiency for the game.

In some examples, because a game usually includes different scenes, a storage capacity for lightmaps generated by the light baking tool is quite large. In this case, the user terminal 10a needs to have sufficient free memory space for storing the lightmaps. If the user terminal 10a has limited free memory space, the user terminal 10a may store the lightmaps generated by the light baking tool to the server 10d. To be specific, the server 10b shown in FIG. 1 may be configured to store lightmaps generated by a light baking tool on each user terminal. During rendering for objects in a game scene, the user terminal 10a may initiate a request to the server 10d to obtain lightmaps stored on the server 10d, and complete a rendering process corresponding to the objects in the game scene based on the obtained lightmaps. The lightmaps in this example of this application may be stored on the user terminal, or may be stored on the server 10d, or may be stored based on a cloud storage technology or a blockchain network. This is not limited herein.

The following describes the light baking tool on the user terminal by using the user terminal 10a shown in FIG. 1 as an example. During light baking by using the light baking tool on the user terminal 10a, a user may perform a start operation on the light baking tool on the user terminal 10a. In this case, the user terminal 10a may start the light baking tool on the user terminal 10a in response to the start operation, and enter a parameter configuration interface of the light baking tool. The user may set configuration parameters for light baking on the parameter configuration interface.

FIG. 2 is a schematic diagram of a parameter configuration interface of a light baking tool. A current interface shown in FIG. 2 is a parameter configuration interface 20a of the light baking tool. On the parameter configuration interface 20a, a user may choose whether to enable ray guiding. If the user chooses to enable ray guiding, corresponding configuration parameters for ray guiding may be set on the parameter configuration interface 20a. As shown in FIG. 2, the parameter configuration interface 20a may include configuration parameters for two-dimensional lightmaps in the light baking tool, for example, on/off type parameters: whether to enable light baking, whether to enable a denoiser mode, whether to enable path guiding, and the like; and numerical type parameters: samples per pixel in a scene, max bounces of a ray, and the like. The on/off type parameters may correspond to an on state and an off (or disabled) state. The numerical type parameters may be set to any values within a preset range.

It can be understood that whether to enable light baking may be a configuration parameter with a highest priority on the parameter configuration interface 20a. After the user enables light baking, configuration parameters, such as whether to enable a denoiser mode, samples per pixel in a scene, max bounces of a ray, and whether to enable path guiding, on the parameter configuration interface 20a are operable. For example, FIG. 2 shows that the denoiser mode is disabled, path guiding in the light baking tool is enabled, the samples per pixel is set to a1, and the max bounces of a ray is set to a2. In a case that the user does not enable light baking (disables light baking), it indicates that the user does not need to perform light baking currently. In this case, configuration parameters such as whether to enable a denoiser mode, samples per pixel in a scene, max bounces of a ray, and whether to enable path guiding may be inoperable.

After the user chooses to enable path guiding in the light baking tool, the parameter configuration interface 20a may further include configuration parameters corresponding to lightmap path guiding, for example, base samples per iteration, max bounces, multi important sampling fraction, build iterations, max Dtree depth, Dtree threshold, SDtree max memory, Stree threshold, and other configuration parameters. The foregoing configuration parameters may be numerical type parameters, and each configuration parameter may be set to a fixed value. For example, the max bounces may be set to 6, and the build iterations may be set to 6.

During light baking, surface illumination for each texture element (also referred to as texel) in a scene needs to be calculated, and a surface illumination calculation result for the texture element is associated with incident ray distribution corresponding to the texture element. For example, sampled rays corresponding to the texture element may be generated based on a surface material of the texture element and direct light sampling. The sampled rays may be used as the incident ray distribution of the texture element. In some complex scenes, because objects in the scene may block each other, sampling only based on a surface material and direct illumination may result in many ineffective ray samples, that is, a large quantity of ray samples are wasted. Therefore, in this application, path guiding may be enabled on the parameter configuration interface 20a. Through path guiding, more samples may be captured in a region with large energy in the incident ray distribution, and fewer samples may be captured in a region with small energy in the incident ray distribution. This can not only reduce a quantity of sampled rays, but also improve accuracy of the incident ray distribution. In this example of this application, incident ray distribution corresponding to a texture element in a scene after path guiding is enabled may be represented by a spatial directional tree (SDTree). The spatial directional tree may be considered as a tree-shaped data structure, and may be obtained by performing spatial division on a scene and performing directional division on sampled rays in the scene.

Figure 3:
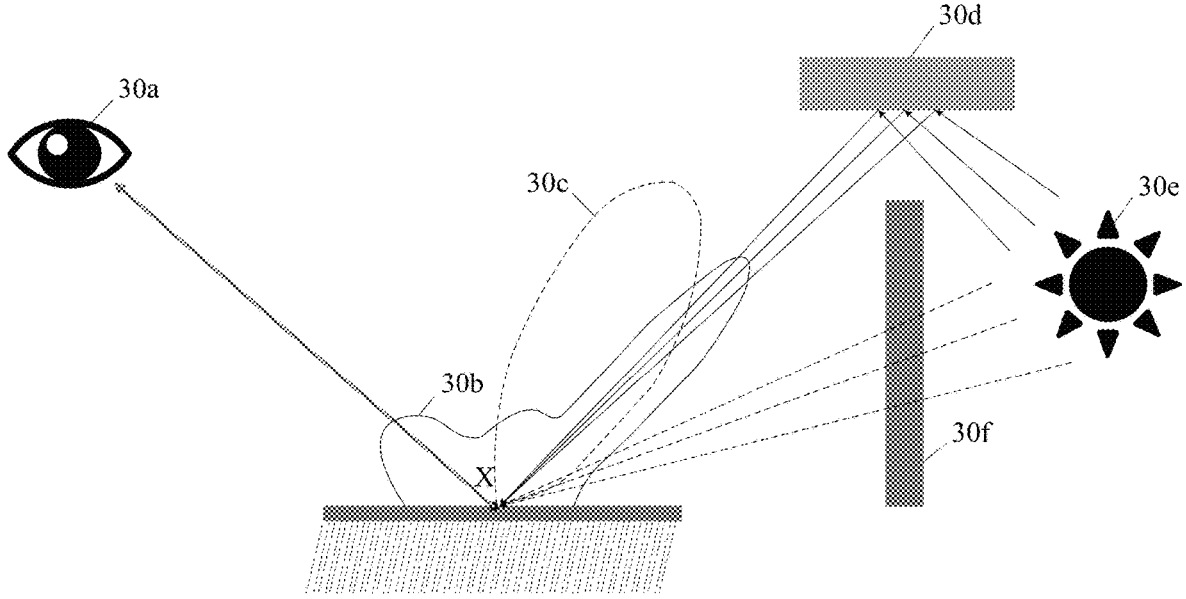
FIG. 3 is a schematic diagram of path guiding in a scene.

FIG. 3 is a schematic diagram of path guiding in a scene. As shown in FIG. 3, for a texture element X in the scene (e.g., a point requiring illumination calculation), a region 30e may be represented as a location of an incident light source. Based on a surface material of the texture element X and direct light source sampling corresponding to a light source in the region 30e, it can be determined that sampled rays corresponding to the texture element X are indicated by black dashed lines with arrows shown in FIG. 3. A reflection proportion 30c corresponding to the rays represented by the black dashed lines with arrows may also be referred to as a bidirectional reflectance distribution function (BRDF). An object 30f is located between the light source in the region 30e and the texture element X, and the sampled rays represented by the black dashed lines with arrows are blocked by the object 30f. To be specific, the sampled rays represented by the black dashed lines with arrows are ineffective incident rays for the texture element X. Based on probe rays transmitted by the light source in the region 30e (for example, based on directions of the sampled rays represented by the black dashed lines with arrows, a ray direction is constantly adjusted to generate the probe rays), it can be determined that incident ray distribution in path guiding is indicated by black solid lines with arrows shown in FIG. 3, to be specific, rays represented by black solid lines with arrows pointing at an object 30d in the region 30e, and rays that are represented by black solid lines with arrows and that are reflected by the object 30d to the texture element X. Incident ray radiosity 30b (for example, an incident ray color) corresponding to the texture element X is obtained based on the rays represented by the black solid lines with arrows. In other words, for the texture element X, after path guiding of the light baking tool is enabled, the rays represented by the black dashed lines with arrows may be changed to the rays represented by the black solid lines with arrows. Emergent light radiosity (also referred to as a light rendering result) corresponding to the texture element X (e.g., in a direction of a line of sight from the texture element X to a region 30a) may be determined based on the rays represented by the black solid lines with arrows (for example, the incident ray distribution). The region 30a may be represented as a location of an eye (or a camera). By enabling path guiding in the light baking tool, accuracy of the incident ray distribution can be improved.

FIG. 4 is a schematic flowchart of a rendering method. It can be understood that the rendering method may be performed by a user terminal, for example, the user terminal 10a shown in FIG. 1. As shown in FIG. 4, the rendering method may include the following step S101 to step S103:

Step S101: Obtain (e.g., determine) a texture element x in a to-be-rendered scene, and obtain a target spatial directional tree corresponding to the to-be-rendered scene. The target spatial directional tree may be used for representing incident ray distribution corresponding to a texture element in the to-be-rendered scene after path guiding is enabled, and x being a positive integer.

Specifically, during rendering (for example, in a game development stage), illumination may be calculated for a scene to obtain an illumination result corresponding to the scene. In this application, a scene that needs to be rendered may be referred to as a to-be-rendered scene. For any texture element (for example, a texture element x, where x may be a positive integer less than or equal to a quantity of texture elements in the to-be-rendered scene, for example, x may be 1, 2, . . . ) in the to-be-rendered scene, the user terminal (for example, the user terminal 10a in the example corresponding to FIG. 1) may obtain a target spatial directional tree corresponding to the to-be-rendered scene. The target spatial directional tree may be used for representing ray guiding distribution corresponding to the texture element in the to-be-rendered scene. For example, the target spatial directional tree may represent incident ray distribution pre-built for the to-be-rendered scene after path guiding is enabled, and may represent the incident ray distribution corresponding to the texture element in the scene. The incident ray distribution herein may be distribution of incident ray radiosity, for example, distribution of incident ray radiance.

Different to-be-rendered scenes may correspond to different target spatial directional trees or a same target spatial directional tree. For example, one to-be-rendered scene may correspond to one target spatial directional tree, or different to-be-rendered scenes (for example, to-be-rendered scenes in a game development stage) may correspond to a same target spatial directional tree. A building process for the target spatial directional tree is further described with reference to FIG. 6.

Step S102: Obtain, based on the target spatial directional tree, a scene spatial region to which the texture element x belongs, and obtain incident ray distribution corresponding to the texture element x based on a quantity of light paths and light energy in the scene spatial region.

Specifically, the user terminal may obtain, from the target spatial directional tree, the scene spatial region to which the texture element x belongs, that is, determine a spatial location of the texture element x in the to-be-rendered scene based on the target spatial directional tree, and then may obtain, from the target spatial directional tree, a quantity of light paths passing through the scene spatial region and light energy corresponding to the scene spatial region, to determine the incident ray distribution corresponding to the texture element x.

The target spatial directional tree may include a target spatial tree and a target directional tree, the target spatial tree may be used for representing a spatial division result for the to-be-rendered scene, and the target directional tree may be used for representing a ray direction division result for the to-be-rendered scene. Both the target spatial tree and the target directional tree may be in a tree-shaped structure. For example, the target spatial tree may include spatial nodes at different levels, and each spatial node may correspond to a spatial region in the to-be-rendered scene. Sizes of spatial regions corresponding to different spatial nodes may be the same or different. The target directional tree may include directional nodes at different levels, and one leaf node of the target spatial tree may correspond to one target directional tree. The user terminal may traverse spatial nodes in the target spatial tree, obtain a second spatial node matching the texture element x from the target spatial tree, and determine a spatial region corresponding to the second spatial node as the scene spatial region to which the texture element x belongs; and then may obtain, from the target spatial tree, the quantity of light paths passing through the scene spatial region, obtain a second directional node matching the texture element x from a target directional tree corresponding to the second spatial node, and determine the incident ray distribution corresponding to the texture element x based on the quantity of light paths and light energy corresponding to the second directional node.

The user terminal may traverse the spatial nodes in the target spatial tree, and determine the second spatial node to which the texture element x belongs in the target spatial tree. The second spatial node may be a leaf node in the target spatial tree, and texture elements in a scene spatial region corresponding to the second spatial node may have a same quantity of light paths. For example, a quantity of light paths passing through the second spatial node may also be considered as the quantity of light paths passing through the texture element x. Light energy in a direction of a ray passing through the texture element x is obtained based on the target directional tree corresponding to the second spatial node. The incident ray distribution corresponding to the texture element x may be determined based on the quantity of light paths and the light energy. The incident ray distribution may include an incident ray corresponding to the texture element x and light energy of each incident ray in a ray direction of the incident ray. One texture element x may correspond to one or more incident rays.

Step S103: Determine a light rendering result corresponding to the texture element x based on an incident ray corresponding to the incident ray distribution.

Specifically, after obtaining the incident ray distribution corresponding to the texture element x based on the target spatial directional tree, the user terminal may determine a ray attenuation parameter corresponding to the texture element x based on an incident ray in the incident ray distribution and a normal corresponding to the texture element x. The light rendering result, also referred to as a light baking result, corresponding to the texture element x may be calculated based on the incident ray distribution and the ray attenuation parameter. The incident ray may be considered as a ray that is sampled from the target spatial directional tree and that meets the incident ray distribution, and may also be referred to as a sampled sample. A larger included angle between the incident ray and the normal for the texture element x indicates a larger value of the ray attenuation parameter. If the included angle between the incident ray and the normal for the texture element x is 0, it indicates that the incident ray is directly irradiated on the texture element x. In this case, the ray attenuation parameter is the smallest and all energy of the incident ray can be used for calculation for light baking.

In some examples, the user terminal may obtain an incident ray passing through the texture element x from the incident ray distribution, obtain the incident ray corresponding to the texture element x based on the incident ray distribution, and determine the ray attenuation parameter corresponding to the texture element x based on the included angle between the incident ray and the normal corresponding to the texture element x. The user terminal may also obtain incident radiosity and a reflection proportion corresponding to the incident ray, and perform an integral operation on a product of the incident radiosity, the reflection proportion, and the ray attenuation parameter to obtain the light rendering result corresponding to the texture element x. The incident radiosity may be represented by a luminous flux, irradiance, light intensity, radiance, and/or the like. The luminous flux may be represented as light power, to be specific, total energy passing through a specific region per unit time, for example, total energy passing through the scene spatial region in which the texture element x is located per unit time. The luminous flux may be an indicator for representing overall brightness of a light source. The irradiance may be used for describing light energy measured by area, for example, power per unit area. The irradiance may be an indicator for representing brightness of light irradiated on a plane. The light intensity may be represented as transmit power of a light source at different angles, and is an indicator for representing sterance of the luminous flux. The radiance may be used for measuring a differential of the irradiance at a solid angle, and is an indicator for representing intensity of light transmitted from a secondary light source, such as a light source, a reflecting surface, or a transmitting surface, to an observer (an eye or a camera). A type of the incident radiosity used for calculating the light rendering result is not limited in this application. The reflection proportion may be a reflection proportion for rays from an incident direction (for example, a direction of incident rays) corresponding to the texture element x to an emergent direction, for example, a bidirectional reflectance distribution function (BRDF), and a sum of a proportion of incident rays and a proportion of emergent rays is 1.

In one or more examples, a calculation method for the light rendering results can be expressed as follows:

$$L(x,\omega_o)=\int L_i(x,\omega_i)f(x,\omega_i,\omega_o)(w_i\cdot\omega_n)d\omega_i \qquad (1)$$

In the formula (1), x may be expressed as the texture element x, for example, any texture element in the to-be-rendered scene, $\omega i$ may be expressed as an angle of an incident ray, $\omega o$ may be expressed as an angle of an emergent ray, and $\omega n$ may be expressed as the normal of the texture element x. $L(x, \omega_o)$ may be expressed as the light rendering result corresponding to texture element x, or may be considered as emergent radiosity (for example, brightness of emergent light, namely, a rendering color) corresponding to an emergent ray for the texture element x. $L_i(x, \omega_i)$ may be expressed as incident radiosity (for example, brightness of incident light) corresponding to an incident ray for the texture element x. $f(x, \omega_i, \omega_o)$ may be expressed as the reflection proportion for rays from the incident direction of the texture element x to the emergent direction, for example, the bidirectional reflectance distribution function (BRDF). $(w_i\cdot\omega_n)$ may be expressed as incident light attenuation (namely, the ray attenuation parameter) caused by an angle of an incident ray. $\int \ldots d\omega_i$ may be expressed as a hemispherical integral in a direction of incident rays, for example, may be understood as a cumulative sum of infinitesimals and a cumulative sum of all incident rays within a hemispherical range.

Figure 5:
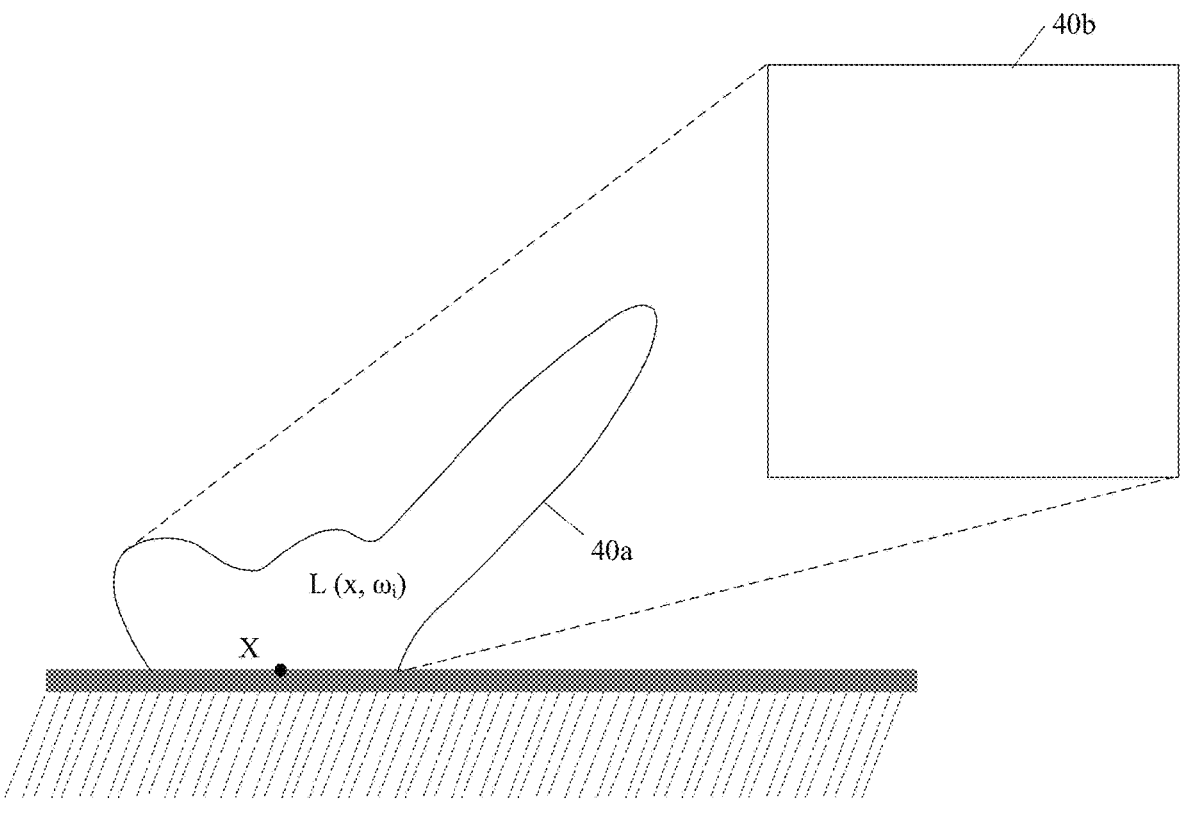
FIG. 5 is a schematic diagram of cylindrical coordinate representation of a ray direction.

In some examples, in three-dimensional space, a ray location (for example, a location of a starting point of the ray) may be considered as a three-dimensional variable, and a ray direction may be considered as a two-dimensional variable. In this case, $L_i(x, \omega_i)$ may be considered as a five-dimensional function (a three-dimensional ray location and two-dimensional ray direction). A ray direction may alternatively be expressed as a three-dimensional variable. This is not limited in this application. In this example of this application, a ray direction may be represented by using a cylindrical coordinate system. FIG. 5 is a schematic diagram of cylindrical coordinate representation of a ray direction. As shown in FIG. 5, for the texture element x in the to-be-rendered scene, it is assumed that incident radiosity corresponding to an incident ray for the texture element x is L (x, $\omega i$), and L (x, $\omega i$) may be represented by a region 40a shown in FIG. 5. In this case, in the cylindrical coordinate system, all incident ray directions of the texture element x may be represented by a region 40b shown in FIG. 5 (the region 40b may be considered as a two-dimensional region, and each point in the region may be expressed as an incident ray direction).

In a rendering scene, a light rendering result may be calculated for each texture element in the to-be-rendered scene by using the formula (1), that is, a light rendering result for a surface of each texture element in the to-be-rendered scene may be obtained by using the formula (1). The formula (1) is only an example for determining a light rendering result. Variations based on the formula (1) or parameter replacements in the formula (1) can be all considered as solutions protected by this application. This is not limited in this application.

In this example of this application, for any texture element (for example, the texture element x) in the to-be-rendered scene, a location (e.g., a scene spatial region) of the texture element x in the to-be-rendered scene may be determined based on a pre-built target spatial directional tree for the to-be-rendered scene. Light energy in a ray direction corresponding to the texture element x is determined based on a quantity of light paths in the scene spatial region, to obtain incident ray distribution corresponding to the texture element x. A light rendering scene corresponding to the texture element x may be determined based on the incident ray distribution. Because ray guiding is introduced into the target spatial directional tree, both spatial division in the to-be-rendered scene and ray direction division in the to-be-rendered scene are considered. Accurate incident ray distribution can be obtained based on the target spatial directional tree, so that rendering quality for the to-be-rendered scene can be improved.

The target spatial directional tree corresponding to the to-be-rendered scene needs to be pre-built before light baking is performed on the to-be-rendered scene. The following describes a building process for the target spatial directional tree with reference to FIG. 6 to FIG. 13.

FIG. 6 is a schematic flowchart of building a spatial directional tree. The spatial directional tree may be built by the user terminal 10a shown in FIG. 1 or another device. As shown in FIG. 6, a building process for a spatial directional tree may include the following step S201 to step S207:

Step S201: Obtain a probe ray for a to-be-rendered scene in an $N^{th}$ iteration. If N is 1, the probe ray in the $N^{th}$ iteration being determined based on material attribute information corresponding to the to-be-rendered scene, and N being a positive integer.

Specifically, the user terminal may transmit a probe ray to the to-be-rendered scene to calculate incident ray distribution corresponding to a texture element in the to-be-rendered scene and apply the incident ray distribution in light baking for the to-be-rendered scene. The incident ray distribution may be represented by a spatial directional tree, or the incident ray distribution may be obtained through learning by using a machine learning method. A machine learning method for the incident ray distribution is not limited in this application. For ease of understanding, the following describes a building process for a spatial directional tree by using an example in which the spatial directional tree is used for representing incident ray distribution.

The user terminal may build a spatial directional tree by transmitting probe rays in an iterative optimization manner. A probe ray in a next iteration may be determined based on a spatial directional tree built in a previous iteration. A spatial directional tree built in the last iteration may be used as a target spatial directional tree corresponding to the to-be-rendered scene. The target spatial directional tree is used as incident ray distribution of the to-be-rendered scene in light baking. The probe ray may be a sampled ray for building a spatial directional tree, and may also be referred to as a build sample. A ray meeting the incident ray distribution in a spatial directional tree of a previous iteration may be used as a probe ray in a next iteration. In a process of building a spatial directional tree, an iteration stop condition may be preset for the spatial directional tree. The iteration stop condition may be a maximum quantity of iterations or an iteration convergence condition. For example, if the iteration stop condition is the maximum quantity of iterations, the maximum quantity of iterations may be denoted as N+1, where N is a positive integer, and N may be set to 1, 2, . . . . After a spatial directional tree for an $(N+1)^{th}$ iteration is obtained, the iterative optimization process may be stopped, and the spatial directional tree for the $(N+1)^{th}$ iteration may be used as the target spatial directional tree corresponding to the to-be-rendered scene. If the iteration stop condition is the iteration convergence condition, after a spatial directional tree is obtained in each iteration, the spatial directional tree may be compared with the iteration convergence condition. If a spatial directional tree in a $t^{th}$ iteration (assuming that t is a positive integer less than N+1) meets the iteration convergence condition, the spatial directional tree in the $t^{th}$ iteration may be used as the target spatial directional tree corresponding to the to-be-rendered scene. In some examples, the iteration stop condition may alternatively include the maximum quantity of iterations (assuming the maximum quantity of iterations is N+1) and the iteration convergence condition. If a spatial directional tree still does not meet the iteration convergence condition after N+1 times of iterative optimization, a spatial directional tree in an $(N+1)^{th}$ iteration may be directly used as the target spatial directional tree corresponding to the to-be-rendered scene, to reduce an amount of iterative computation for the spatial directional tree.

In some examples, the iteration stop condition may be the maximum quantity of iterations (assuming that the maximum quantity of iterations is N+1). The user terminal may determine, based on surface material attribute information of a texture element in the to-be-rendered scene and direct light source sampling, a probe ray for the to-be-rendered scene in the first iteration, e.g., a probe ray in a case that N is 1, as indicated by blacked dashed lines with arrows shown in FIG. 3. A starting point of the probe ray in the first iteration may be obtained based on the probe ray in the first iteration. Then a quantity of light paths passing through the starting point and light energy corresponding to the starting point may be obtained, to build a spatial directional tree in the first iteration. In this case, the first iteration for the spatial directional tree is completed. Then a probe ray in the second iteration may be generated based on the spatial directional tree built in the first iteration, a spatial directional tree is built again based on the probe ray in the second iteration, and the spatial directional tree in the first iteration is replaced with the spatial directional tree in the second iteration. The spatial directional tree built in the first iteration may be updated to the spatial directional tree built in the second iteration. By analogy, when obtaining a spatial directional tree for the to-be-rendered scene in an $(N-1)^{th}$ iteration, the user terminal may generate a probe ray for the to-be-rendered scene in the $N^{th}$ iteration based on the spatial directional tree in the $(N-1)^{th}$ iteration. Compared with a probe ray in a previous iteration, a direction of a probe ray in a next iteration may change. Through continuous iterative optimization, a probe ray can avoid obstacles to a maximum extent, to improve energy utilization of the probe ray.

Step S202: Build a spatial directional tree in the $N^{th}$ iteration based on a starting point corresponding to the probe ray in the $N^{th}$ iteration and light energy corresponding to the probe ray in the $N^{th}$ iteration.

Specifically, the user terminal may build the spatial directional tree in the $N^{th}$ iteration based on the starting point corresponding to the probe ray in the $N^{th}$ iteration and light energy in a direction of the probe ray. A spatial directional tree built in each iteration may include a spatial tree and a directional tree. The spatial tree may be used for representing spatial division results (including a plurality of spatial division regions) for the to-be-rendered scene in different iterations. Each spatial division region may be considered as a leaf node in the spatial tree. For ease of description, leaf nodes in the spatial tree are referred to as spatial leaf nodes below, and each spatial leaf node may store a quantity of rays passing through a corresponding spatial division region. The directional tree may be used for representing a directional division result for rays passing through each spatial division region, and the directional division result may be represented as a leaf node in the directional tree. For ease of description, leaf nodes in the directional tree are referred to as directional leaf nodes below. For example, the spatial directional tree in the $N^{th}$ iteration may include a spatial tree in the $N^{th}$ iteration and a directional tree in the $N^{th}$ iteration. A spatial division result for the to-be-rendered scene in the $N^{th}$ iteration may be used as a spatial leaf node in a spatial tree of the iteration, and one spatial leaf node may correspond to one directional tree. During iterative optimization, a building process for a spatial directional tree may be a building process for a spatial tree and a directional tree. Building processes for spatial directional trees in iterations are similar. A building process for the spatial directional tree in the $(N+1)^{th}$ iteration is used below as an example for description.

Step S203: Generate a probe ray for the to-be-rendered scene in an $(N+1)^{th}$ iteration based on the spatial directional tree in the $N^{th}$ iteration.

Specifically, after the user terminal obtains the spatial directional tree in the $N^{th}$ iteration, a node in the spatial directional tree in the $N^{th}$ iteration may store a quantity of light paths corresponding to each texture element in the to-be-rendered scene and energy (e.g., light energy) in a ray direction, and incident ray distribution corresponding to a texture element in the to-be-rendered scene may be determined based on the spatial directional tree in the $N^{th}$ iteration. In this case, a ray meeting the incident ray distribution may be used as the probe ray in the $(N+1)^{th}$ iteration, and is also guiding distribution after ray guiding is enabled. A quantity of probe rays in the $(N+1)^{th}$ iteration may be less than that in the $N^{th}$ iteration, and a direction of the probe ray in the $(N+1)^{th}$ iteration may also be different from that of the probe ray in the $N^{th}$ iteration.

Step S204: Determine a first spatial node associated with the starting point from the spatial tree in the $N^{th}$ iteration based on a spatial location, in the to-be-rendered scene, of the starting point corresponding to the probe ray in the $(N+1)^{th}$ iteration, and obtain a quantity of node rays passing through the first spatial node.

Specifically, the user terminal may obtain the spatial location, in the to-be-rendered scene, of the starting point corresponding to the probe ray in the $(N+1)^{th}$ iteration, and may determine the first spatial node associated with the probe ray from the spatial tree in the $N^{th}$ iteration based on the spatial location of the starting point. When a probe ray is transmitted to the to-be-rendered scene, a reflected ray for each probe ray in the to-be-rendered scene may be captured after ray guiding is enabled. A quantity of node rays passing through the first spatial node may be counted based on the probe ray and the reflected ray corresponding to the probe ray. The probe ray and the reflected ray corresponding to the probe ray may be used for building a spatial directional tree. The first spatial node may be a leaf node in the spatial tree in the $N^{th}$ iteration, and there may be one or more first spatial nodes. If the starting point of the probe ray is a center point of a spatial region corresponding to a leaf node node1 in the spatial tree in the $N^{th}$ iteration, the leaf node node1 may be determined as a first spatial node. In this case, there is one first spatial node. If the starting point of the probe ray is located in the spatial region corresponding to the leaf node node1 but is not the center point of the spatial region corresponding to leaf node node1, a first adjacent leaf node of the leaf node node1 may be obtained from the spatial tree in the $N^{th}$ iteration, and a distance between the starting point of the probe ray and the first adjacent leaf node may be calculated. A first adjacent leaf node with a distance less than a first preset distance threshold and the leaf node node1 may be determined as first spatial nodes. In this case, there may be a plurality of first spatial nodes. The first preset distance threshold may be a distance between the center point of the spatial region corresponding to the leaf node node1 and a boundary of the spatial region corresponding to the leaf node node1.

In some examples, the user terminal may obtain the spatial location, in the to-be-rendered scene, of the starting point corresponding to the probe ray in the $(N+1)^{th}$ iteration, and determine a spatial filter by using the spatial location of the starting point as a center point; determine a spatial node that is in the spatial tree in the $N^{th}$ iteration and that has an intersection with the spatial filter as the first spatial node, and then may obtain a statistical value of a spatial overlapping region between the first spatial node and the spatial filter; and obtain the quantity of node rays passing through the first spatial node based on a ratio of the statistical value of the spatial overlapping region to a statistical value of a spatial region of the spatial filter. Because the spatial location may be expressed as three-dimensional coordinates, the spatial filter may be considered as a geometric region in three-dimensional space, and a size of the spatial filter is the same as that of a spatial region corresponding to a spatial leaf node in the spatial tree in the $N^{th}$ iteration (for example, a leaf node, to which the starting point of the probe ray belongs, in the spatial tree in the $N^{th}$ iteration). For example, a size of a spatial region of the leaf node, to which the starting point of the probe ray belongs, in the spatial tree in the $N^{th}$ iteration is a1×b1×c1 (a length is a1, a width is b1, and a height is c1). In this case, the spatial filter may be a filter with the spatial location of the starting point of the probe ray as a center point and with a length of a1, a width of b1, and a height of c1. The spatial filter herein may be a box filter (or referred to as a block filter).

Because a spatial leaf node in the spatial tree in the $N^{th}$ iteration may be used for representing a spatial region in the to-be-rendered scene, adjacent spatial regions may correspond to different spatial leaf nodes. Adjacent spatial regions may be represented as adjacent spatial leaf nodes in the spatial tree in the $N^{th}$ iteration. All spatial leaf nodes that are in the spatial tree in the $N^{th}$ iteration and that have intersections with the spatial filter are determined as first spatial nodes, and then the statistical value of the spatial region corresponding to the spatial filter and a statistical value of a spatial overlapping region between each first spatial node and the spatial filter may be calculated. The statistical value of the spatial region may be a volume of the spatial filter, and the statistical value of the spatial overlapping region may be an overlapping volume between the first spatial node and the spatial filter. The ratio of the statistical value of the spatial overlapping region to the statistical value of the spatial region may be used as a weight value corresponding to the first spatial node, and the quantity of node rays passing through the first spatial node may be counted based on a weight value corresponding to each first spatial node and a quantity of probe rays. In some examples, the statistical value of the spatial overlapping region may be used as the weight value corresponding to the first spatial node, and the quantity of node rays passing through the first spatial node may be counted based on the statistical value of the spatial overlapping region and the quantity of probe rays. The spatial tree may be built based on a similarity between spatial leaf nodes, and may be filtered by using the spatial filter to improve building quality for the spatial tree.

In one or more examples, a filtering process (for example, by using a box filter) for the spatial tree may be implemented by a GPU in the user terminal. Specifically, the user terminal may obtain the quantity of probe rays in the $(N+1)^{th}$ iteration and the spatial location (which may be expressed as three-dimensional spatial coordinates) of the starting point of the probe ray in the to-be-rendered scene. The quantity of probe rays and the spatial location of the probe ray may be used as input information in a filtering implementation for the spatial tree. The spatial filter (box filter) may be determined based on the spatial leaf node corresponding to the starting point of the probe ray, and then the spatial nodes in the spatial tree in the $N^{th}$ iteration may be traversed. For example, traversal may be performed in a top-down, bottom-up, or random access manner. A node traversal method for the spatial tree is not limited in this application. For example, a first node queue may be created for the spatial tree in the $N^{th}$ iteration. The first node queue may be a temporary variable for traversing the spatial tree in the $N^{th}$ iteration, or the first node queue may be understood as a queue buffer (memory space for temporarily storing data). Then the first spatial node accessed in the spatial tree in the $N^{th}$ iteration (for ease of description, the first spatial node accessed is referred to as a first accessed node) may be added to the first node queue. In this case, the first accessed node is to-be-processed data in the first node queue.

The first accessed node in the first node queue may perform the following processing: Information about the first accessed node (for example, a level in the spatial tree at which the first accessed node is located, and whether the first accessed node is a spatial leaf node) in the first node queue may be obtained. If the first accessed node is a spatial leaf node, an overlapping volume (e.g., a statistical value of a spatial overlapping region) between the first accessed node and the spatial filter may be obtained. If the overlapping volume is greater than 0, the first accessed node and the spatial filter have an intersection, the first accessed node may be referred to as a first spatial node. Based on a ratio of the calculated overlapping volume to a spatial volume (a statistical value of a spatial region) of the spatial filter, a quantity of node rays for the first accessed node may be determined, and the quantity of node rays may be stored in the first accessed node. If the first accessed node is not a spatial leaf node, child nodes of the first accessed node in the spatial tree in the $N^{th}$ iteration may be traversed, and an overlapping volume between each child node and the spatial filter may be calculated. If a child node of the first accessed node and the spatial filter have an intersection and the child node of the first accessed node is a spatial leaf node, the child node of the first accessed node may be referred to as a first spatial node. A quantity of node rays for the child node may be determined based on a ratio of an overlapping volume between the child node and the spatial filter to a spatial volume of the spatial filter, and the quantity of node rays is stored to the child node. If a child node of the first accessed node and the spatial filter have an intersection but the child node of the first accessed node is not a spatial leaf node, the child node may be added to the first node queue. This indicates that processing for the first accessed node in the first node queue is completed, and the first accessed node may be removed from the first node queue. It can be understood that a process same or similar as the process for the first accessed node may be performed for remaining nodes in the first node queue, until a quantity of node rays corresponding to each spatial leaf node in the spatial tree is obtained. The spatial tree in this application may be a spatial binary tree or a spatial quadtree. A type of the spatial tree is not limited in this application. If the spatial tree is a spatial binary tree, a quantity of child nodes of the first accessed node is 2. If the spatial tree is a spatial quadtree, a quantity of child nodes of the first accessed node is 4.

In this example of this application, during building of a spatial tree, a spatial leaf node (the first spatial node) close to a ray tracing intersection point (an intersection point between a probe ray and the to-be-rendered scene) may be found in the spatial tree, so that calculated guiding distribution is most consistent with distribution of texture elements at a center of the spatial leaf node and is greatly different from edge texture elements of the spatial leaf node. The spatial filter may make use of a similarity between spatial leaf nodes in the spatial tree, to improve building quality for the spatial tree.

Step S205: Update the spatial tree in the $N^{th}$ iteration based on the quantity of node rays corresponding to the first spatial node to obtain a spatial tree in the $(N+1)^{th}$ iteration.

Specifically, the user terminal may determine, based on a quantity of node rays corresponding to a spatial leaf node in the spatial tree in the $N^{th}$ iteration, whether the spatial leaf node in the spatial tree in the $N^{th}$ iteration needs to be divided to obtain the spatial tree in the $(N+1)^{th}$ iteration. For example, light path density corresponding to the first spatial node (the spatial leaf node in the spatial tree in the $N^{th}$ iteration) may be determined based on the quantity of node rays corresponding to the first spatial node. A quantity of node rays stored in the first spatial node may be directly used as the light path density corresponding to the first spatial node; or a ratio of a quantity of node rays stored in the first spatial node to a spatial region corresponding to the first spatial node may be used as the light path density corresponding to the first spatial node.

If the light path density corresponding to the first spatial node is greater than a density threshold (which may be set according to an actual requirement, and this is not limited in this application), spatial division may be performed on the first spatial node in the spatial tree in the $N^{th}$ iteration to obtain a spatial child node corresponding to the first spatial node, and a spatial tree to which the spatial child node is added is used as the spatial tree in the $(N+1)^{th}$ iteration. For example, if the spatial tree is a spatial binary tree, the first spatial node may be divided into two spatial child nodes, and the two spatial child nodes may be used as spatial leaf nodes in the spatial tree in the $(N+1)^{th}$ iteration. If the light path density corresponding to the first spatial node is less than or equal to the density threshold, the first spatial node does not need to be divided. The first spatial node is retained as a spatial leaf node. In some examples, if the light path density corresponding to a spatial child node obtained by dividing the first spatial node is still greater than the density threshold, the spatial child node may be further divided, until light path density corresponding to a spatial leaf node in a newly built spatial tree is less than or equal to the density threshold. In this case, the newly built spatial tree may be referred to as the spatial tree in the $(N+1)^{th}$ iteration.

Figure 7:
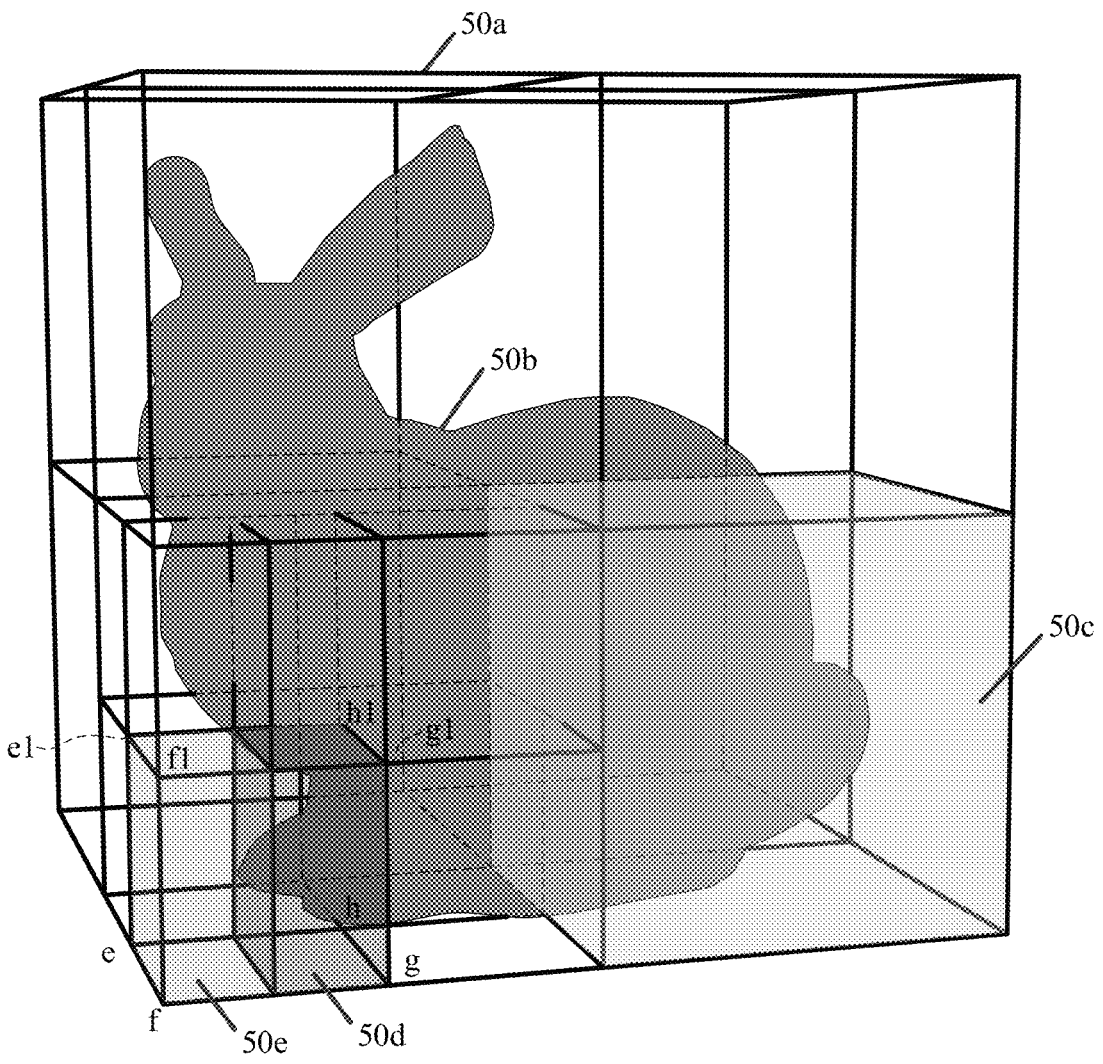
FIG. 7 is a schematic diagram of division of a spatial tree for a scene.

FIG. 7 is a schematic diagram of division of a spatial tree for a scene. A spatial region 50a shown in FIG. 7 represents the to-be-rendered scene. A division result for the spatial region 50a, for example, the spatial tree in the $(N+1)^{th}$ iteration, may be obtained by dividing the to-be-rendered scene by using a spatial binary tree. The spatial tree in the $(N+1)^{th}$ iteration may include spatial nodes at different levels, and each spatial node may be represented as a subregion in the spatial region 50a. To be specific, different subregions may correspond to different spatial nodes in the spatial tree in the $(N+1)^{th}$ iteration. Spatial nodes in the spatial tree in the $(N+1)^{th}$ iteration may be distinguished by solid lines and dashed lines shown in FIG. 7. The solid lines are observable division lines at an angle of view shown in FIG. 7, and the dashed lines are non-observable division lines at the angle of view shown in FIG. 7. For example, the dashed lines are division lines blocked by an object 50b in the to-be-rendered scene.

Whether spatial division is to be performed on the to-be-rendered scene is determined based on the light path density corresponding to a spatial leaf node in the spatial tree in the $N^{th}$ iteration. if the light path density of a current spatial leaf node in the spatial tree in the $N^{th}$ iteration is greater than the density threshold, the current spatial leaf node may be further divided. If the light path density of a current spatial leaf node is less than or equal to the density threshold, the current spatial leaf node does not need to be divided. The spatial tree in the $(N+1)^{th}$ iteration may be obtained based on the foregoing operations. In other words, during spatial division for the to-be-rendered scene (the spatial region 50a), a spatial region with more light paths is divided more finely, and a spatial region with fewer light paths is divided more coarsely.

As shown in FIG. 7, it is assumed that the spatial tree in the $N^{th}$ iteration includes a spatial node 1 (for example, a spatial region 50c) and a spatial node 2 (for example, a spatial region efgh-e1f1g1h1). If the light path density of the spatial node 1 is less than or equal to the density threshold, no interval division needs to be performed on the spatial node 1 in the $(N+1)^{th}$ iteration. If the light path density of the spatial node 2 is greater than the density threshold, the spatial node 2 may be further divided in the $(N+1)^{th}$ iteration to obtain child nodes (e.g., a spatial region 50d and a spatial region 50e) of the spatial node 2. The spatial region 50c (the spatial node 1), the spatial region 50d, and the spatial region 50e may be spatial leaf nodes in the spatial tree in the $(N+1)^{th}$ iteration. The to-be-rendered scene may be adaptively divided based on light path density corresponding to a spatial leaf node in a spatial tree, so that the buffer space for the spatial tree can be reduced.

Step S206: Determine a first directional node associated with the probe ray in the $(N+1)^{th}$ iteration from the directional tree in the $N^{th}$ iteration based on a ray direction corresponding to the probe ray in the $(N+1)^{th}$ iteration, and obtain node light energy in the first directional node based on the light energy corresponding to the probe ray in the (N+1) t iteration.

Specifically, the user terminal may obtain the ray direction corresponding to the probe ray in the $(N+1)^{th}$ iteration, may determine the first directional node associated with the probe ray in the $(N+1)^{th}$ iteration from the directional tree in the $N^{th}$ iteration based on the ray direction, and may obtain the node light energy corresponding to the first directional node based on light energy in the ray direction. The ray direction may be expressed as two-dimensional coordinates. The first directional node may be a leaf node in the directional tree in the $N^{th}$ iteration, and there may be one or more first directional nodes. If the ray direction of the probe ray is a center point of a division region corresponding to a leaf node node2 in the directional tree in the $N^{th}$ iteration, the leaf node node2 may be determined as a first directional node. In this case, there is one first directional node. In If the ray direction of the probe ray is located in the division region corresponding to the leaf node node2 but is not the center point of the division region corresponding to leaf node node2, a second adjacent leaf node of the leaf node node2 may be obtained from the directional tree in the $N^{th}$ iteration, and a distance between the ray direction of the probe ray and the second adjacent leaf node may be calculated. A second adjacent leaf node with a distance less than a second preset distance threshold and the leaf node node2 are determined as first directional nodes. In this case, there may be a plurality of first directional nodes. The second preset distance threshold may be a distance between the center point of the division region corresponding to the leaf node node2 and a boundary of the division region corresponding to the leaf node node2.

In some examples, the user terminal may obtain the ray direction corresponding to the probe ray in the $(N+1)^{th}$ iteration, and determine a directional filter by using the ray direction as a center point; determine a directional node that is in the directional tree in the $N^{th}$ iteration and that has an intersection with the directional filter as the first directional node, and may obtain a statistical value of a directional overlapping region between the first directional node and the directional filter; and obtain the node light energy in the first directional node based on a ratio of the statistical value of the directional overlapping region to a statistical value of a directional region of the directional filter. Because the ray direction may be expressed as two-dimensional coordinates, the directional filter may be considered as a geometric region in two-dimensional space, and a size of the directional filter is the same as that of a division region corresponding to a directional leaf node in the directional tree in the $N^{th}$ iteration (for example, a leaf node, to which the ray direction of the probe ray belongs, in the directional tree in the $N^{th}$ iteration). For example, a size of a division region of the leaf node, to which the ray direction of the probe ray belongs, in the directional tree in the $N^{th}$ iteration is a2×b2 (a length is a2, and a width is b2). In this case, the directional filter may be a filter with the ray direction of the probe ray as a center point and with a length of a2 and a width of b2. Similarly, the directional filter herein may be a box filter. The statistical value of the directional region may be an area of the directional filter, and the statistical value of the directional overlapping region may be an overlapping area between the first directional node and the directional filter. The ratio of the statistical value of the directional overlapping region to the statistical value of the directional region is used as a weight value corresponding to the first directional node, and the node light energy in the first directional node may be counted based on a weight value corresponding to each first directional node and the light energy corresponding to the probe ray. In some examples, the statistical value of the directional overlapping region may alternatively be directly used as the weight value corresponding to the first directional node, and then the node light energy in the first directional node may be counted based on the statistical value of the directional overlapping region and the light energy corresponding to the probe ray. The directional tree may be built based on a similarity between directional leaf nodes, and may be filtered by using the directional filter to improve building quality for the directional tree.

In one or more examples, a filtering process (for example, by using a box filter) for the directional tree may be implemented by a GPU in the user terminal. Specifically, the user terminal may obtain the ray direction (which may be expressed as two-dimensional coordinates) of the probe ray in the $(N+1)^{th}$ iteration and an energy value (light energy, for example, radiance) in the ray direction. The ray direction and the light energy may be used as input information in a filtering implementation for the directional tree. The directional filter (box filter) is determined based on a directional leaf node corresponding to the ray direction of the probe ray, and then directional nodes in the directional tree in the $N^{th}$ iteration may be traversed. A node traversal method for the directional tree may be the same as or different from that for the spatial tree. The node traversal method for the directional tree is not limited in this application. For example, a second node queue may be created for the directional tree in the $N^{th}$ iteration. The second node queue may be a temporary variable for traversing the directional tree in the $N^{th}$ iteration, or the second node queue may also be understood as a queue buffer. Then the first directional node accessed in the directional tree in the $N^{th}$ iteration (for ease of description, the first directional node accessed is referred to as a second accessed node) may be added to the second node queue. In this case, the second accessed node is to-be-processed data in the second node queue.

The second accessed node in the second node queue may perform the following processing: Information about the second accessed node (for example, a level in the directional tree at which the second accessed node is located, and whether the second accessed node is a directional leaf node) in the second node queue may be obtained. If the second accessed node is a directional leaf node, an overlapping area (a statistical value of a directional overlapping region) between the second accessed node and the directional filter may be obtained. If the overlapping area is greater than 0, to be specific, the second accessed node and the directional filter have an intersection, the second accessed node may be referred to as a first directional node. A ratio of the calculated overlapping area to a region area (a statistical value of a directional region) of the directional filter is multiplied by light energy in a direction of a probe ray to obtain node light energy in the second accessed node, and the node light energy is stored to the second accessed node. In a case that the second accessed node is not a directional leaf node, child nodes of the second accessed node in the directional tree in the $N^{th}$ iteration may be traversed, and an overlapping area between each child node and the directional filter is calculated. If a child node of the second accessed node and the directional filter have an intersection and the child node of the second accessed node is a directional leaf node, the child node of the second accessed node may be referred to as a first directional node. A ratio of the overlapping area to a region area of the directional filter is multiplied by light energy in a direction of a probe ray to obtain node light energy in the child node, and the node light energy is stored to the child node. If a child node of the second accessed node and the directional filter have an intersection but the child node of the second accessed node is not a directional leaf node, the child node may be added to the second node queue. This indicates that processing for the second accessed node in the second node queue is completed, and the second accessed node may be removed from the second node queue. It can be understood that a processing process same as that for the second accessed node may be performed for remaining nodes in the second node queue, until node light energy corresponding to each directional leaf node in the directional tree is obtained. The directional tree in this application may be a directional binary tree or a directional quadtree. A type of the directional tree is not limited in this application. If the directional tree is a directional quadtree, a quantity of child nodes of the second accessed node is 4.

Step S207: Update the directional tree in the $N^{th}$ iteration based on the node light energy in the first directional node to obtain a directional tree in the $(N+1)^{th}$ iteration, and determine the spatial tree in the $(N+1)^{th}$ iteration and the directional tree in the $(N+1)^{th}$ iteration as the target spatial directional tree.

Specifically, the user terminal may obtain a directional parent node corresponding to the first directional node from the directional tree in the $N^{th}$ iteration, and obtain node light energy stored in the directional parent node, where the first directional node is obtained by dividing the directional parent node; and obtain an energy ratio of the node light energy stored in the first directional node to the node light energy stored in the directional parent node. If the energy ratio is greater than an energy ratio threshold (which may be set according to an actual requirement, and this is not limited in this application), directional division may be performed on the first directional node in the directional tree in the $N^{th}$ iteration to obtain a directional child node corresponding to the first directional node, and a directional tree to which the directional child node is added is used as the directional tree in the $(N+1)^{th}$ iteration. For example, if the directional tree is a quadtree, the first directional node may be divided into four directional child nodes, and the four directional child nodes may be used as directional leaf nodes in the directional tree in the $(N+1)^{th}$ iteration. If the energy ratio is less than or equal to the energy ratio threshold, the first directional node does not need to be divided, that is, the first directional node is retained as a directional leaf node. In some examples, after the first directional node is further divided to obtain a directional child node, if an energy ratio of node light energy in the directional child node to the node light energy in the first directional node is still greater than the energy ratio threshold, the directional child node may be further divided, until a ratio of node light energy in a directional leaf node in a newly built directional tree to node light energy in a directional parent node of the directional leaf node is less than or equal to the energy ratio threshold. In this case, the newly built directional tree may be referred to as the directional tree in the $(N+1)^{th}$ iteration.

In this example of this application, during building of a spatial directional tree, a quantity of node rays stored in each spatial leaf node in a spatial tree may be used as a basis for further division of the spatial tree, and an energy ratio of node light energy stored in each directional leaf node in a directional tree to node light energy stored in a directional parent node of the directional leaf node may be used as a basis for further division of the directional tree. To be specific, the spatial directional tree may be adaptively divided based on the quantity of node rays and the node light energy. Spatial directional trees at different granularities may be generated for the to-be-rendered scene through adaptive division. This can reduce the buffer space for the spatial directional tree, and therefore can improve quality of light baking.

In one or more examples, an adaptive division process for a spatial directional tree may include: The spatial directional tree in the $N^{th}$ iteration may be used as a spatial directional tree for sampling (samplingSDtree), and the spatial directional tree in the $(N+1)^{th}$ iteration is referred to as a to-be-built spatial directional tree (buildingSDtree). During building of the spatial directional tree, a maximum depth of a directional tree (for example, the configuration parameter Max Dtree Depth in the example corresponding to FIG. 2, where if the maximum depth is set to 10, the directional tree no longer needs to be divided when a quantity of levels of the directional tree reaches 10), an energy ratio threshold (which may be denoted as, for example, fluxThreshold) for each node in the directional tree, a light path density threshold (which may be denoted as, for example, maxSampleThreshold) included in each node in a spatial tree, and other parameters may be preset.

Assuming that the spatial tree in the spatial directional tree is a spatial binary tree and the directional tree is a directional quadtree, the user terminal may re-divide the spatial tree (the spatial binary tree) by using a quantity of node rays (or light path density) stored in a spatial tree for previous sampling (the spatial tree in the $N^{th}$ iteration). For a condition for re-dividing the spatial tree based on the quantity of node rays (or light path density), refer to the foregoing descriptions. Details are not described herein again. In addition, the user terminal may further re-divide the directional tree (the directional quadtree) by using an energy ratio corresponding to each node in a directional tree for previous sampling (the directional tree in the $N^{th}$ iteration). A quantity of levels of a re-divided directional tree needs to be less than or equal to the maximum depth of the directional tree. For a condition for re-dividing the directional tree based on the energy ratio, refer to the foregoing descriptions. Details are not described herein again.

A new ray may be generated by using a spatial directional tree for sampling. In this case, the new ray may be referred to as a probe ray, and radiosity (node light energy, for example, radiance) and a quantity of ray samples (a quantity of node rays) in each direction may be added to a leaf node of a to-be-built spatial directional tree. Radiosity and quantities of ray samples of child nodes in the to-be-built spatial directional tree may be summed from the bottom up, and a value may be assigned to a parent node. Then the spatial directional tree for sampling may be replaced with a cumulative spatial directional tree to obtain the spatial directional tree in the $(N+1)^{th}$ iteration.

Figure 8:
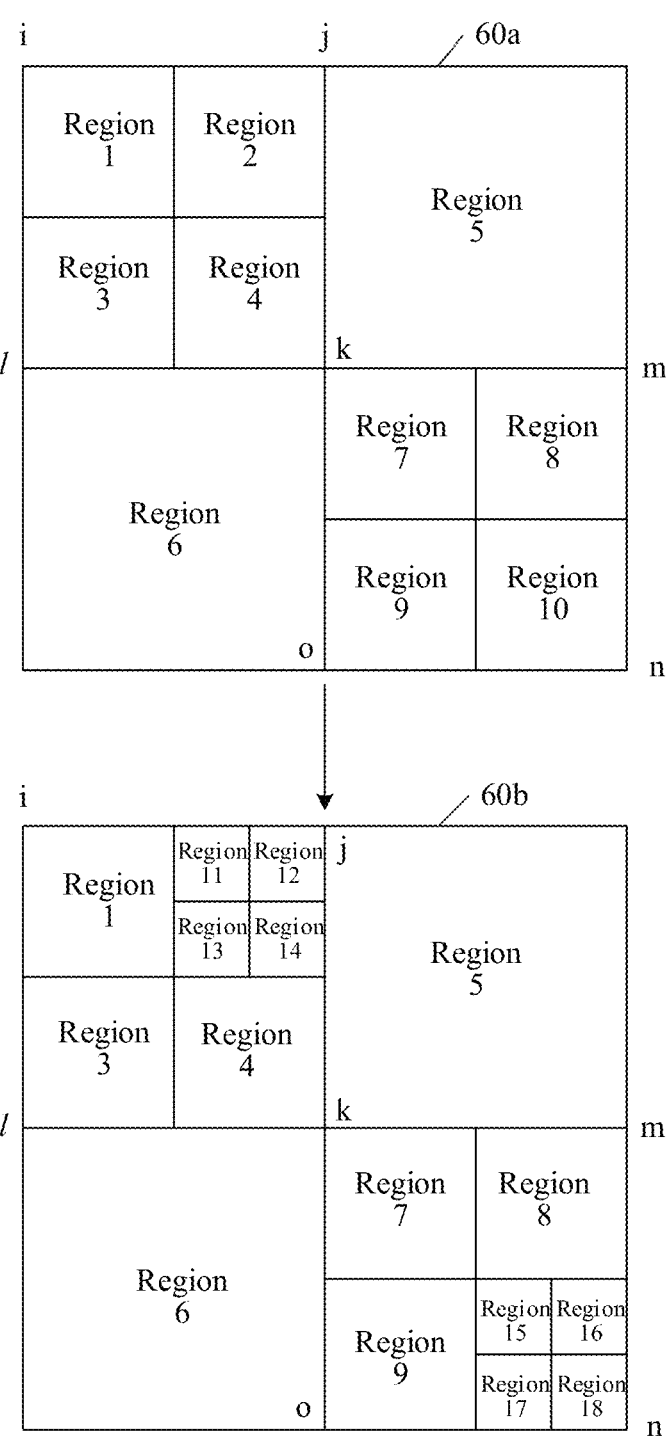
FIG. 8 is a schematic diagram of division of a directional tree for a ray.

FIG. 8 is a schematic diagram of division of a directional tree for a ray. In this example of this application, an example in which the directional tree is a quadtree is used for describing a directional division process for a probe ray. A ray direction in a to-be-rendered scene may be expressed as two-dimensional coordinates. It is assumed that a directional tree for a probe ray in an $N^{th}$ iteration in the to-be-rendered scene is a directional division result 60a shown in FIG. 8. The directional division result 60a may include 10 regions: a region 1, a region 2, . . . , and a region 10. Each region in the directional division result 60a may be considered as a directional leaf node in the directional tree in the $N^{th}$ iteration. A region ijkl may be considered as a directional parent node of the region 1, the region 2, the region 3, and the region 4 in the directional tree in the $N^{th}$ iteration. A region kmno may be considered as a directional parent node of the region 7, the region 8, the region 9, and the region 10 in the directional tree in the $N^{th}$ iteration. Directional leaf nodes and directional auxiliary nodes are directional nodes in the directional tree in the $N^{th}$ iteration.

The user terminal may obtain node light energy stored in each directional node in the directional tree in the $N^{th}$ iteration, and may determine whether a current directional leaf node needs to be divided based on an energy ratio of node light energy stored in a directional leaf node in the directional tree to node light energy stored in a directional parent node of the directional leaf node. As shown in FIG. 8, an energy ratio of node light energy stored in the region 2 to node light energy stored in the region ijkl, and an energy ratio of node light energy stored in the region 10 to node light energy stored in the region kmno are both greater than an energy ratio threshold. Therefore, the region 2 may be divided into a region 11, a region 12, a region 13, and a region 14, and the region 10 may be divided into a region 15, a region 16, a region 17, and a region 18. In other words, the region 11, the region 12, the region 13, and the region 14 may be referred to as directional child nodes of the region 2, and the region 15, the region 16, the region 17, and the region 18 may be referred to as directional child nodes of the region 10. An energy ratio of node light energy stored in any region other than the region 2 and the region 10 in the directional division result 60a to node light energy stored in a directional parent node of the region is less than or equal to the energy ratio threshold. Therefore, the region other than the region 2 and the region 10 does not need to be divided. A directional division result 60*b* may be obtained by performing the foregoing operations on the directional division result 60*a*. The directional division result 60*b* may be expressed as a directional tree in an $(N+1)^{th}$ iteration, and the directional division result 60*a* is replaced with the directional division result 60*b*.

Figure 9:
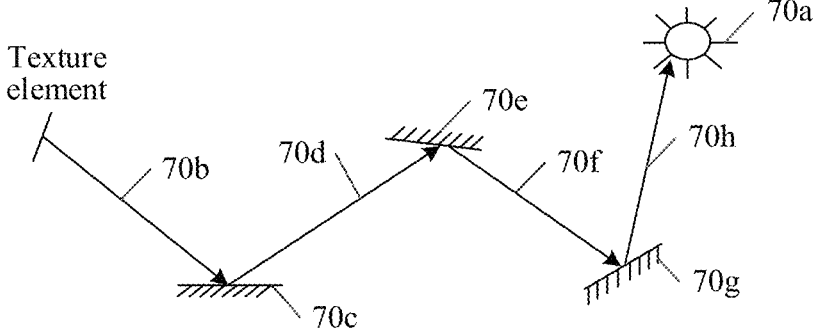
FIG. 9 is a schematic diagram of an entire light path.

In some examples, during building of a spatial directional tree, each reflected ray (bouncing ray) in an entire light path may be used as a sample ray for building the spatial directional tree. An entire light path may include all bouncing rays generated if a probe ray transmitted to a to-be-rendered scene encounters an obstacle in the to-be-rendered scene. One or more sample rays may be sampled in an entire light path. FIG. 9 is a schematic diagram of an entire light path. As shown in FIG. 9, a ray from a texture element in a to-be-rendered scene to a light source 70*a* may be referred to as an entire light path. After ray guiding is enabled, a first bouncing ray 70*b*, a second bouncing ray 70*d*, a third bouncing ray 70*f*, and a fourth bouncing ray 70*h* in the light path may be used as sample rays. The first bouncing ray 70*b* bounces when passing an obstacle 70*c* to generate second bouncing ray 70*d*. The second bouncing ray 70*d* bounces when passing an obstacle 70*e* to generate the third bouncing ray 70*f*. The third bouncing ray 70*f* bounces when passing an obstacle 70*g* to generate the fourth bouncing ray 70*h*. Building quality for the spatial directional tree can be improved by using a plurality of bouncing rays in the entire light path in a case that a total quantity of light paths remains unchanged.

Figure 10:
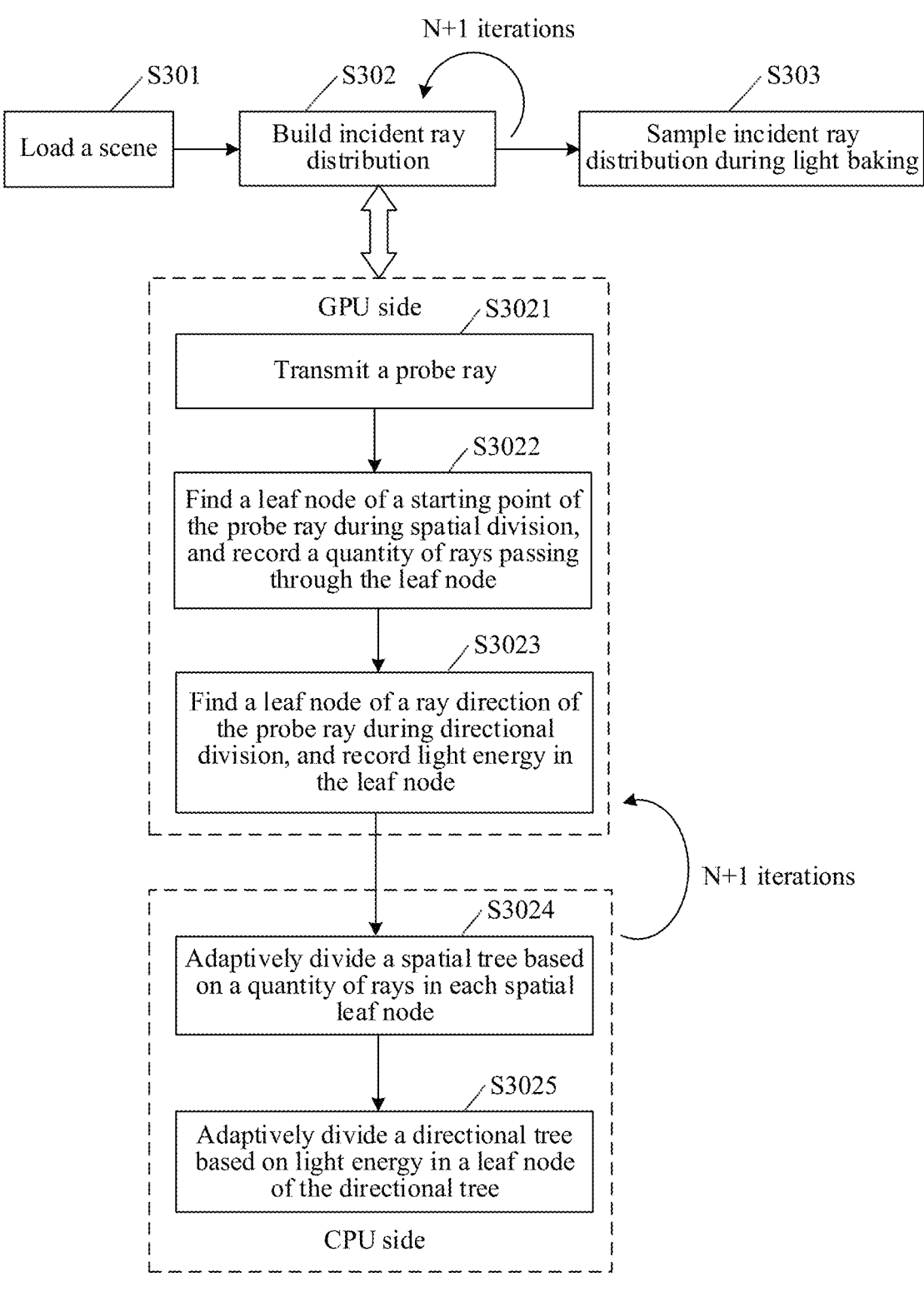
FIG. 10 is a schematic flowchart of building and sampling based on ray guiding.

FIG. 10 is a schematic flowchart of building and sampling based on ray guiding. As shown in FIG. 10, a building and sampling process based on ray guiding may include the following step S301 to step S303:

Step S301: Load a scene.

Specifically, during light baking for a scene (a to-be-rendered scene, for example, a game scene), the scene may be loaded on a user terminal, and probe rays may be transmitted to the scene. The probe rays may be used for building incident ray distribution corresponding to the scene.

Step S302: Build incident ray distribution.

Specifically, the user terminal may transmit probe rays in an iterative optimization manner, and may build a spatial directional tree based on the probe rays. A probe ray may be generated in a next iteration by using a spatial directional tree built in a previous iteration, and a spatial directional tree may be rebuilt. In an $(N+1)^{th}$ iteration, a spatial directional tree in the $(N+1)^{th}$ iteration may be used as a final target spatial directional tree. In this case, the target spatial directional tree may be used for representing incident ray distribution corresponding to a texture element in the scene.

Step S303: Sample incident ray distribution during light baking.

Specifically, for any texture element in the scene, incident ray distribution corresponding to the texture element may be sampled in the built target spatial directional tree. Based on the sampled incident ray distribution, light baking may be performed on the texture element. For a specific processing process, refer to the descriptions in the example corresponding to FIG. 4. Details are not described herein again.

In step S302, to obtain the final target spatial directional tree (which may represent the incident ray distribution), N+1 times of iterative optimization need to be performed. Processing processes in all iterations are similar. Therefore, any one of the N+1 iterations may be used below as an example for describing a building process for a spatial directional tree. A building process for a spatial directional tree may include the following step S3021 to step S3025:

Step S3021: Transmit a probe ray.

Specifically, in each iteration, a probe ray may be first transmitted to the scene (the to-be-rendered scene). If a current iteration (an iteration being performed) is the first iteration, a probe ray may be generated based on material attribute information of a texture surface in the scene and direct light sampling. If a current iteration is not the first iteration, a probe ray may be obtained through sampling based on a spatial directional tree built in a previous iteration. For example, incident ray distribution in the spatial directional tree in the previous iteration may be used as a probe ray in the current iteration.

Step S3022: Find a leaf node of a starting point of the probe ray during spatial division, and record a quantity of rays passing through the leaf node.

Specifically, the leaf node of the starting point of the probe ray during spatial division, for example, a spatial leaf node in a spatial tree in the previous iteration, may be found, and a quantity of rays (a quantity of node rays) passing through the spatial leaf node may be recorded. During recording of the quantity of rays for the spatial leaf node, a spatial filter (for example, a box filter) may be used for filtering, to improve building quality for a spatial tree based on a similarity between spatial leaf nodes. For each spatial leaf node in the spatial tree, a quantity of rays passing through the spatial leaf node may be recorded in the same manner.

Step S3023: Find a leaf node of a ray direction of the probe ray during directional division, and record light energy in the leaf node.

Specifically, the leaf node of the ray direction of the probe ray during directional division, for example, a directional leaf node in a directional tree in the previous iteration, may be found, and light energy (node light energy) in the directional leaf node, namely, light energy in the ray direction of the probe ray, is recorded. During recording of the light energy for the directional leaf node, a directional filter (for example, a box filter) may be used for filtering, to improve building quality for a directional tree based on a similarity between directional leaf nodes. For each directional leaf node in the directional tree, light energy in the directional leaf node may be recorded in the same manner.

In one or more examples, a building and sampling task based on ray guiding may be divided based on hardware characteristics. For example, during building of a spatial directional tree, probe rays may be transmitted in parallel based on a ray tracing capability of a GPU. In addition, a quantity of rays at each intersection point (an intersection point between a probe ray and the scene) (to be specific, a quantity of rays for a spatial leaf node in which the intersection point is located) and light energy in a ray direction (to be specific, light energy in a directional leaf node in which the ray direction is located) are cached. In other words, step S3021 to step S3023 may be completed on the GPU side of the user terminal, and a building speed for the spatial directional tree can be increased based on a parallel processing capability of the GPU.

Step S3024: Adaptively divide a spatial tree based on a quantity of rays in each spatial leaf node.

Specifically, light path density corresponding to each spatial leaf node may be determined based on a quantity of rays recorded in each spatial leaf node in the spatial tree, and then the spatial tree may be adaptively divided based on the light path density. If the light path density of the spatial leaf node is greater than a density threshold, the spatial leaf node is further divided. If the light path density of the spatial leaf node is less than or equal to the density threshold, the spatial leaf node does not need to be divided.

Step S3025: Adaptively divide a directional tree based on light energy in a leaf node of the directional tree.

Specifically, an energy ratio of each directional leaf node to a directional parent node of the directional leaf node may be determined based on light energy recorded in each directional leaf node in the directional tree, and then the directional tree is adaptively divided based on the energy ratio. If the energy ratio of the directional leaf node is greater than an energy ratio threshold, the directional leaf node is further divided. If the energy ratio of the directional leaf node is less than or equal to the energy ratio threshold, the directional leaf node does not need to be divided.

In one or more examples, the spatial tree and the directional tree may be adaptively divided based on a logical operation capability of a central processing unit (CPU) to obtain a spatial directional tree in the current iteration. The spatial directional tree in the current iteration may be used for generating a probe ray in a next iteration. Step S3021 may be performed on the GPU side again. In other words, step S3024 and step S3025 may be completed on the CPU side of the user terminal, and building quality for the spatial directional tree can be improved based on the logical operation capability of the CPU.

Figure 11A:
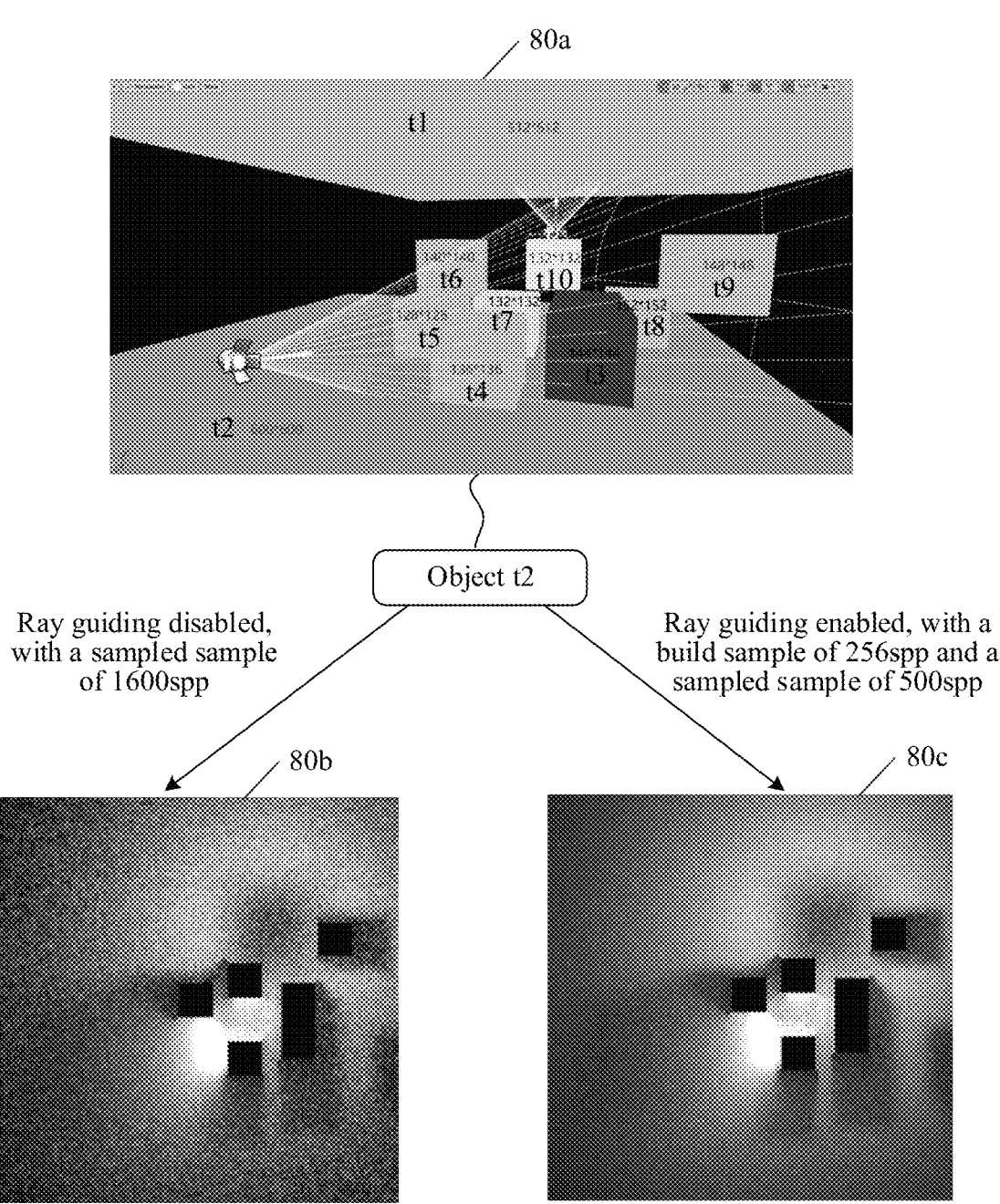
FIG. 11*a* is a schematic diagram of comparison between ray guiding effects.
Figure 11B:
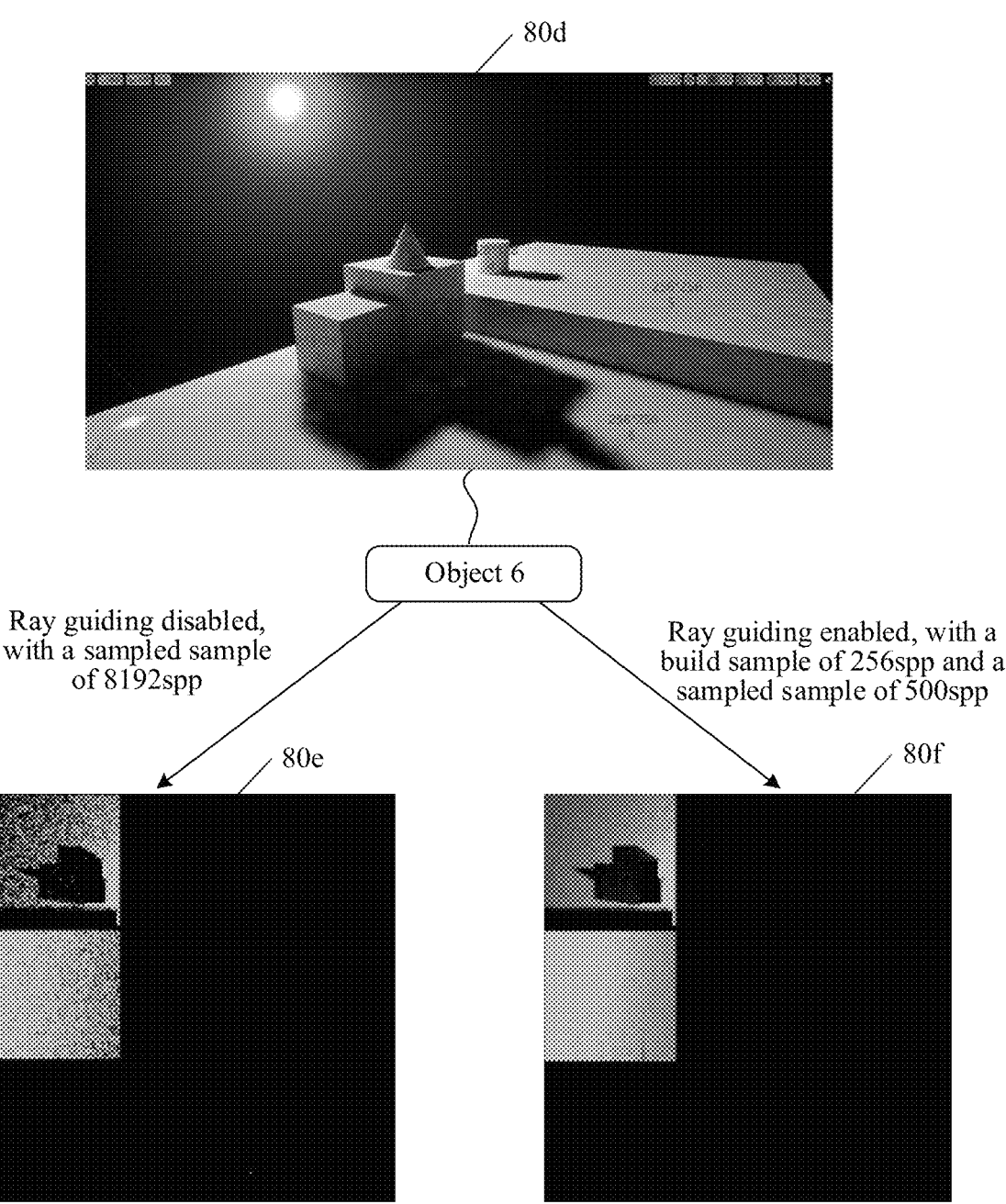
FIG. 11*b* is another schematic diagram of comparison between ray guiding effects.

In some examples, a plurality of groups of experiments may be performed in a light baking tool to verify illumination effects of the ray guiding solution (the spatial directional tree) proposed in this application. Refer to FIG. 11a and FIG. 11b. FIG. 11a is a schematic diagram of comparison between ray guiding effects. As shown in FIG. 11a, in the light baking tool, a test scene 80a is used as an example for verifying light baking effects of ray guiding in a complex scene. In the test scene 80a, most objects can be illuminated only by indirect light due to mutual blocking between objects. The test scene 80a may include an object t1, an object t2, . . . , and an object t10. Each object has a corresponding resolution. Different objects may correspond to different resolutions, or may correspond to a same resolution. For example, a resolution of the object t1 is 512×512, a resolution of the object t2 is 600×600, and a resolution of the object t3 is 144×144.

For the object t2 in the test scene 80a, if ray guiding is disabled and light baking is performed on the object t2 in the test scene 80a by using a sampled sample (incident ray distribution) of 1600 spp (the spp herein represents an entire light path and refers to samples per pixel), a light baking result for the object t2 is shown in an image 80b. If ray guiding is enabled, a target spatial directional tree (SDTree) is built by using a build sample (a probe ray) of 256 spp, and a sampled sample of 500 spp is obtained from the target spatial directional tree for performing light baking on the object t2 in the test scene 80a, a light baking result for the object t2 is shown in an image 80c. As shown in FIG. 11a, light baking quality (the image 80c) when ray guiding is enabled is higher than light baking quality (the image 80b) achieved by using a doubled quantity of sampled samples when ray guiding is disabled.

FIG. 11b is another schematic diagram of comparison between ray guiding effects. As shown in FIG. 11b, in the light baking tool, a test scene 80d is used as an example for verifying light baking effects of ray guiding in a complex scene. The test scene 80d includes only one mesh light that does not participate in direct light sampling. The test scene 80d may include an object 1, an object 2, . . . , and an object 6. Each object may also have a corresponding resolution.

For example, a resolution of the object 1 is 256×256, a resolution of the object 2 is 256×256, and a resolution of the object 3 is 32×32. For the test scene 80d, if ray guiding is disabled and light baking is performed on the object 6 in the test scene 80d by using a sampled sample of 8192 spp, a light baking result for the object 6 is shown in an image 80e. If ray guiding is enabled, a target spatial directional tree (SDTree) is built by using a build sample of 256 spp, and a sampled sample of 500 spp is obtained from the target spatial directional tree for performing light baking on the object 6 in the test scene 80d, a light baking result for the object 6 is shown in an image 80f. As shown in FIG. 11b, in the test scene 80d, a distance between self-illumination and an object (for example, the object 6) is long, and an effective light path is narrow. Therefore, if ray guiding is disabled, light baking quality (the image 80e) is not quite good even if the sampled sample of 8192 spp is used. However, after ray guiding is enabled, good light baking quality (the image 80f) can be achieved only with the sampled sample of 500 spp.

Figure 12:
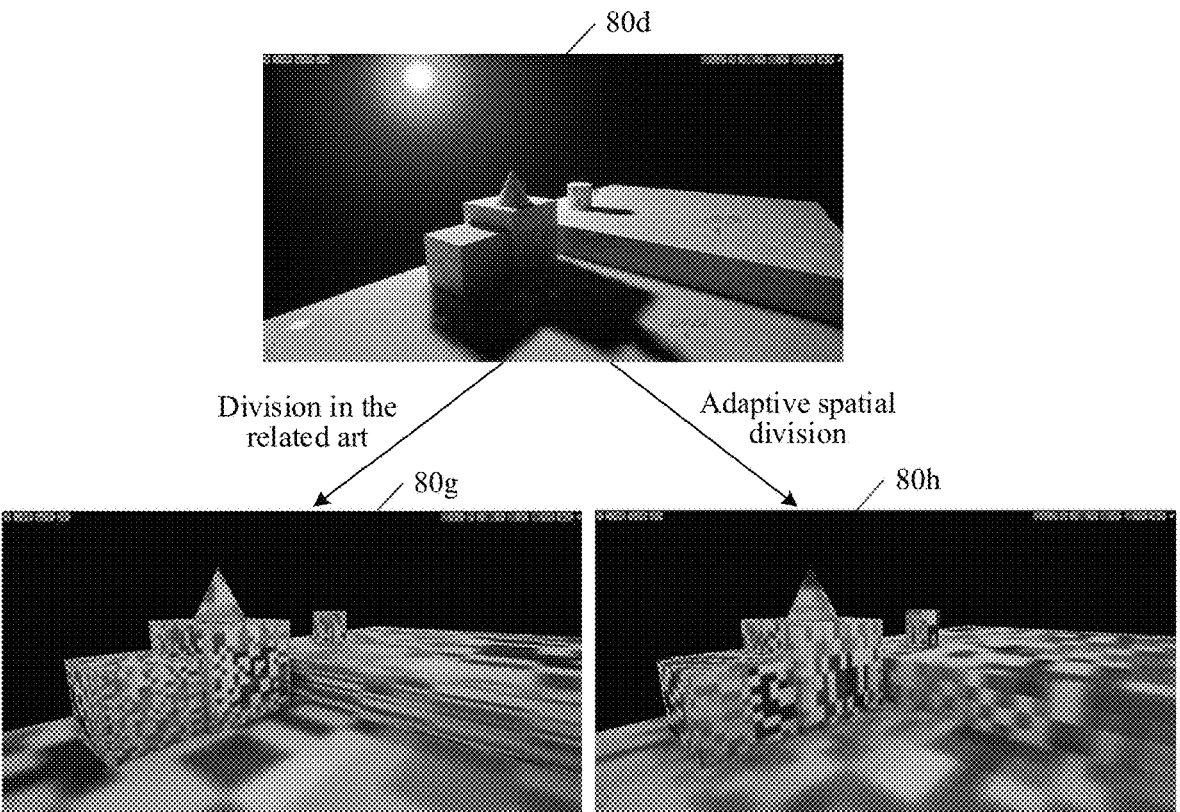
FIG. 12 is a schematic diagram of an adaptive spatial division result.

FIG. 12 is a schematic diagram of an adaptive spatial division result. As shown in FIG. 12, whether building and division are to be performed may be determined based on light path density corresponding to a spatial leaf node in a spatial tree. A region with more light paths may be divided more finely, and a region with fewer light paths may be divided more coarsely. However, in the related art, reference is made only to location information and normal information of a surface of a texture element and a quantity of texture elements, and many parameters need to be adjusted. The test scene 80d is used as an example. A spatial division result obtained through division of the test scene 80d in the related art is shown in an image 80g, and a spatial division result obtained through division by using the adaptive spatial division solution proposed in this application is shown in an image 80h. It can be learned from FIG. 12 that, in a spatial division solution in the related art, because a difference of normals is large at a corner of an object, spatial division is performed quite finely, wasting a large amount of storage space. However, in the adaptive spatial division solution, overall uniformity is achieved, and a quantity of leaf nodes is small, so that storage space can be saved.

In some examples, if directional division is performed on the game scene 80a in FIG. 11a by using a uniform division solution, division may be uniformly performed based on a size of 5×5. This result may be compared with the adaptive directional division solution proposed in this application. Quantities of nodes in built directional trees and storage space in the foregoing two solutions may be shown in Table 1:

TABLE 1

|  | Uniform division | Adaptive directional division |
| --- | --- | --- |
| Quantity of nodes in a directional tree | 1.48e10 | 3.68e5 |
| Storage space | 711G | 17M |

As shown in Table 1, a quantity of nodes in a directional tree built by using the uniform directional division solution is 1.48e10, and occupied storage space is 711G (G herein is a capacity unit); and a quantity of nodes in a directional tree built by using the adaptive directional division solution is 3.68e5, and occupied storage space is 17M (M herein is a capacity unit). This further verifies that a quantity of nodes in a spatial directional tree can be reduced in the adaptive division solution, thereby saving storage space.

Figure 13:
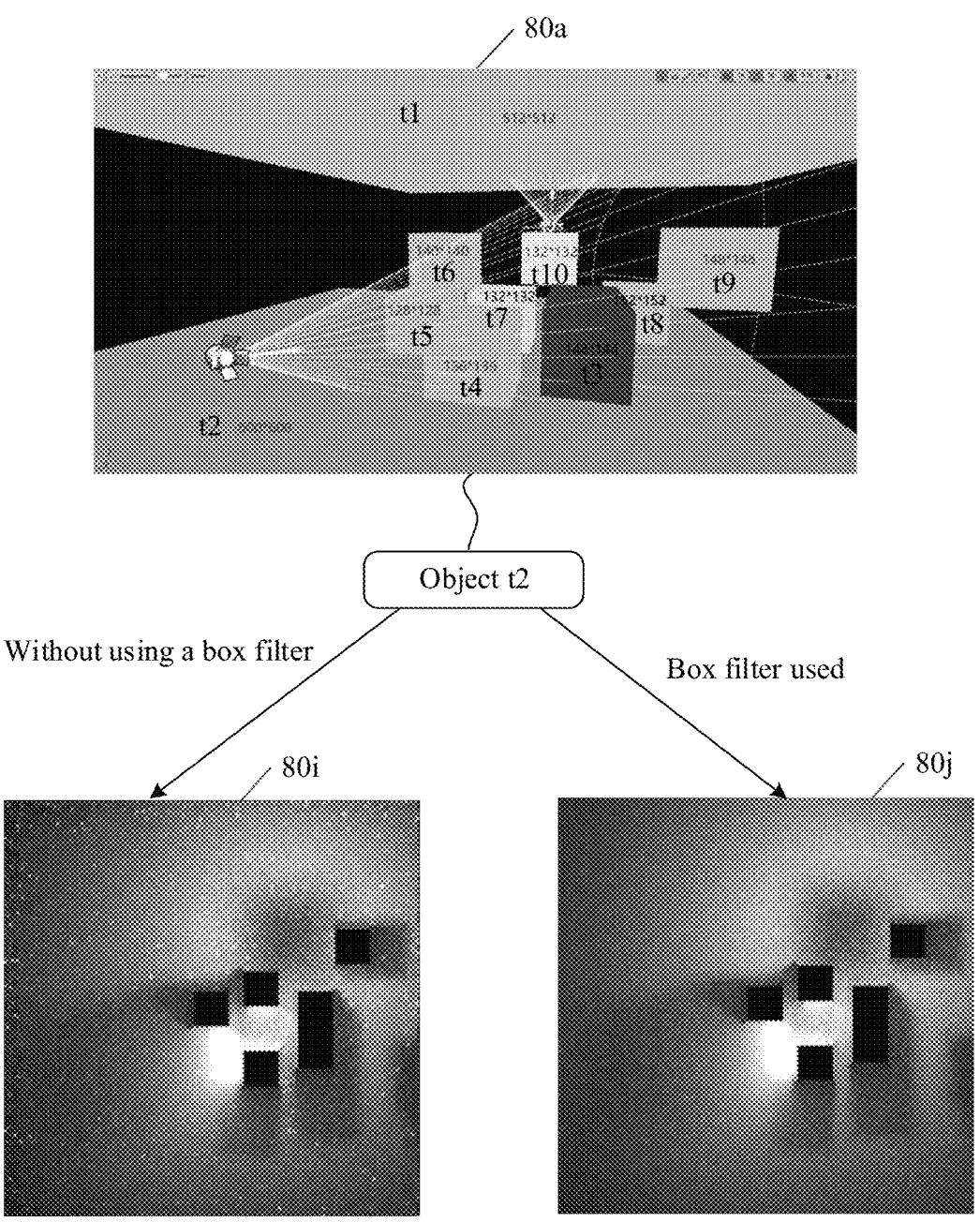
FIG. 13 is a schematic diagram of a filter result of a spatial directional tree.

FIG. 13 is a schematic diagram of a filter result of a spatial directional tree. As shown in FIG. 13, the test scene 80a is used as an example. During building of a spatial directional tree, a target spatial directional tree may be built by using a box filter (for example, the foregoing spatial filter and directional filter) based on a similarity between spatial leaf nodes in a spatial tree and a similarity between directional leaf nodes in a directional tree. Light baking is performed on the object t2 in the test scene 80a based on the target spatial directional tree, and an obtained light baking result is shown in an image 80j (or the image 80c in FIG. 11a). If no box filter is used during building of a spatial directional tree, light baking is performed on the object t2 in the test scene 80a based on the spatial directional tree, and an obtained light baking result is shown in an image 80i. It can be learned from FIG. 13 that use of a box filter during building of a spatial directional tree can improve building quality for the spatial directional tree, and therefore improve light baking quality.

In this example, a spatial directional tree may be built by using a GPU in a user terminal, to increase a building speed for the spatial directional tree. The spatial directional tree may be built by using a box filter (a spatial filter and a directional filter) technology based on a similarity between spatial leaf nodes and a similarity between directional leaf nodes, to reduce a quantity of samples required for building the spatial directional tree. In addition, the spatial directional tree may be adaptively divided based on light path density of a spatial leaf node and an energy ratio of a directional leaf node to a directional parent node of the directional leaf node, to improve building quality for the spatial directional tree. If the spatial directional tree is applied to a light baking scene in which ray guiding is enabled, light baking quality for the scene can be improved.

Figure 14:
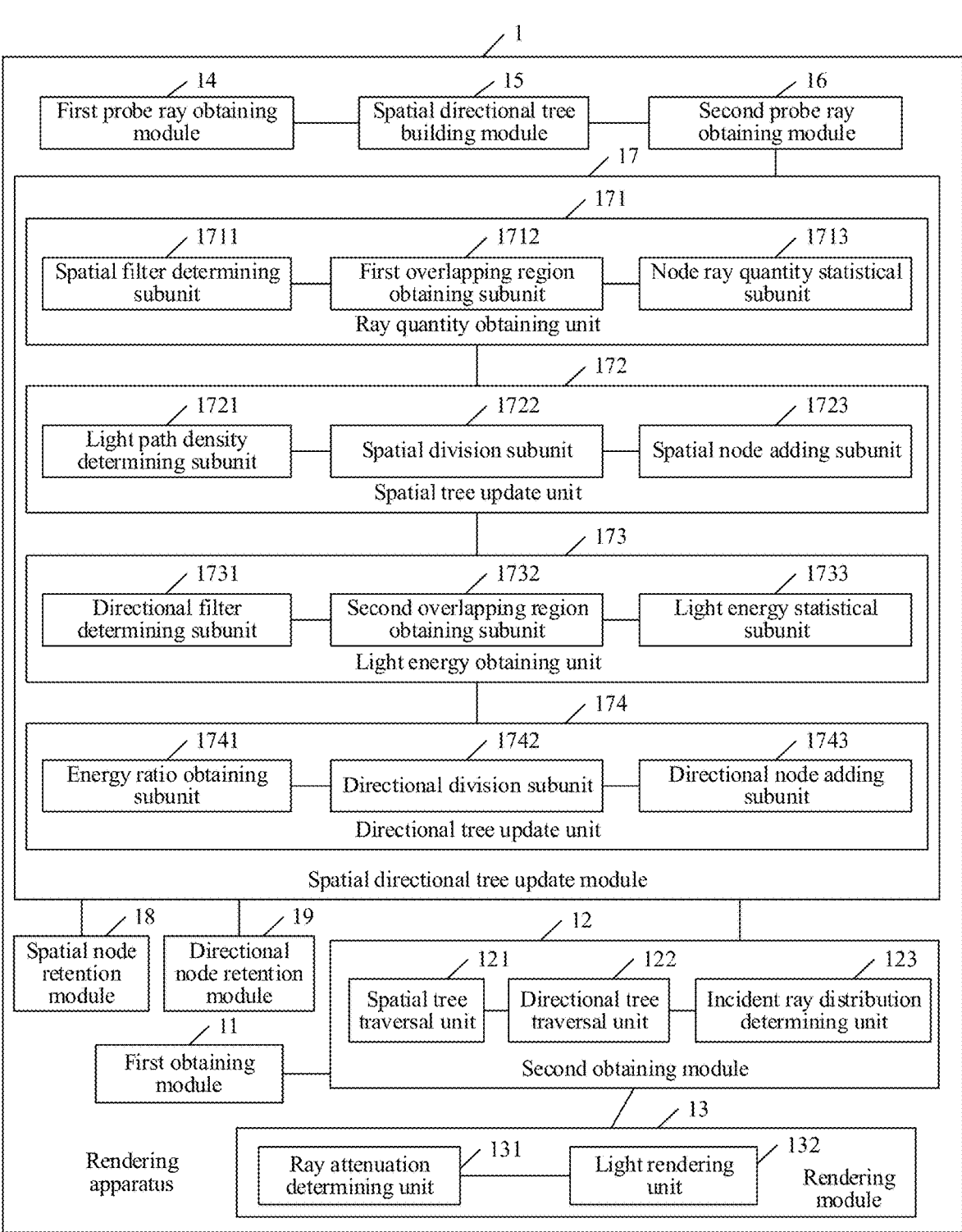
FIG. 14 is a schematic structural diagram of a rendering apparatus.

FIG. 14 is a schematic structural diagram of a rendering apparatus. It can be understood that the rendering apparatus may be mounted in a user terminal, for example, the user terminal 10a shown in FIG. 1. As shown in FIG. 14, the rendering apparatus 1 may be a computing device that includes a first obtaining module 11, a second obtaining module 12, and a rendering module 13.

The first obtaining module 11 is configured to obtain a texture element x in a to-be-rendered scene, and obtain a target spatial directional tree corresponding to the to-be-rendered scene, the target spatial directional tree being used for representing incident ray distribution corresponding to a texture element in the to-be-rendered scene after path guiding is enabled, and x being a positive integer.

The second obtaining module 12 is configured to obtain, from the target spatial directional tree, a scene spatial region to which the texture element x belongs, and obtain incident ray distribution corresponding to the texture element x based on a quantity of light paths and light energy in the scene spatial region.

The rendering module 13 is configured to determine a light rendering result corresponding to the texture element x based on an incident ray corresponding to the incident ray distribution.

In one or more examples, the target spatial directional tree includes a target spatial tree and a target directional tree, the target spatial tree is used for representing a spatial division result for the to-be-rendered scene, and the target directional tree is used for representing a ray direction division result for the to-be-rendered scene; and the second obtaining module 12 may include a spatial tree traversal unit 121, a directional tree traversal unit 122, and an incident ray distribution determining unit 123.

The spatial tree traversal unit 121 is configured to traverse spatial nodes in the target spatial tree, obtain a second spatial node matching the texture element x from the target spatial tree, and determine a spatial region corresponding to the second spatial node as the scene spatial region to which the texture element x belongs.

The directional tree traversal unit 122 is configured to obtain the quantity of light paths in the scene spatial region, and obtain a second directional node matching the texture element x from a target directional tree corresponding to the second spatial node.

The incident ray distribution determining unit 123 is configured to determine the incident ray distribution corresponding to the texture element x based on the quantity of light paths and light energy corresponding to the second directional node.

In one or more examples, the rendering module 13 may include a ray attenuation determining unit 131 and a light rendering unit 132.

The ray attenuation determining unit 131 is configured to obtain an incident ray corresponding to the texture element x based on the incident ray distribution, and determine a ray attenuation parameter corresponding to the texture element x based on an included angle between the incident ray and a normal corresponding to the texture element x.

The light rendering unit 132 is configured to obtain incident radiosity and a reflection proportion corresponding to the incident ray, and perform an integral operation on a product of the incident radiosity, the reflection proportion, and the ray attenuation parameter to obtain the light rendering result corresponding to the texture element x.

For specific functional implementations of the first obtaining module 11, the second obtaining module 12, the rendering module 13, the spatial tree traversal unit 121, the directional tree traversal unit 122, the incident ray distribution determining unit 123, the ray attenuation determining unit 131, and the light rendering unit 132, refer to step S101 to step S103 in the example corresponding to FIG. 4. Details are not described herein again.

In one or more examples, the rendering apparatus 1 may further include a first probe ray obtaining module 14, a spatial directional tree building module 15, a second probe ray obtaining module 16, and a spatial directional tree update module 17.

The first probe ray obtaining module 14 is configured to obtain a probe ray for the to-be-rendered scene in an $N^{th}$ iteration, in a case that N is 1, the probe ray in the $N^{th}$ iteration being determined based on material attribute information corresponding to the to-be-rendered scene, and N being a positive integer.

The spatial directional tree building module 15 is configured to build a spatial directional tree in the $N^{th}$ iteration based on a starting point corresponding to the probe ray in the $N^{th}$ iteration and light energy corresponding to the probe ray in the $N^{th}$ iteration.

The second probe ray obtaining module 16 is configured to generate a probe ray for the to-be-rendered scene in an $(N+1)^{th}$ iteration based on the spatial directional tree in the $N^{th}$ iteration.

The spatial directional tree update module 17 is configured to build a spatial directional tree in the $(N+1)^{th}$ iteration based on a starting point corresponding to the probe ray in the $(N+1)^{th}$ iteration and light energy corresponding to the probe ray in the $(N+1)^{th}$ iteration, and determine the spatial directional tree in the $(N+1)^{th}$ iteration as the target spatial directional tree.

For specific functional implementations of the first probe ray obtaining module 14, the spatial directional tree building module 15, the second probe ray obtaining module 16, and the spatial directional tree update module 17, refer to step S201 to step S207 in the example corresponding to FIG. 6. Details are not described herein again.

In one of more examples, the spatial directional tree in the $N^{th}$ iteration includes a spatial tree in the $N^{th}$ iteration and a directional tree in the $N^{th}$ iteration, the spatial tree in the $N^{th}$ iteration is used for representing a spatial division result for the to-be-rendered scene in the $N^{th}$ iteration, and the directional tree in the $N^{th}$ iteration is used for representing a ray direction division result for the to-be-rendered scene in the $N^{th}$ iteration; and the spatial directional tree update module 17 may include a ray quantity obtaining (e.g., determining) unit 171, a spatial tree update unit 172, a light energy obtaining unit 173, and a directional tree update unit 174.

The ray quantity obtaining unit 171 is configured to determine a first spatial node associated with the starting point from the spatial tree in the $N^{th}$ iteration based on a spatial location, in the to-be-rendered scene, of the starting point corresponding to the probe ray in the $(N+1)^{th}$ iteration, and obtain a quantity of node rays passing through the first spatial node.

The spatial tree update unit 172 is configured to update the spatial tree in the $N^{th}$ iteration based on the quantity of node rays corresponding to the first spatial node to obtain a spatial tree in the $(N+1)^{th}$ iteration.

The light energy obtaining unit 173 is configured to determine a first directional node associated with the probe ray in the $(N+1)^{th}$ iteration from the directional tree in the $N^{th}$ iteration based on a ray direction corresponding to the probe ray in the $(N+1)^{th}$ iteration, and obtain node light energy in the first directional node based on the light energy corresponding to the probe ray in the $(N+1)^{th}$ iteration.

The directional tree update unit 174 is configured to update the directional tree in the $N^{th}$ iteration based on the node light energy in the first directional node to obtain a directional tree in the $(N+1)^{th}$ iteration, and determine the spatial tree in the $(N+1)^{th}$ iteration and the directional tree in the $(N+1)^{th}$ iteration as the target spatial directional tree.

For specific functional implementations of the ray quantity obtaining unit 171, the spatial tree update unit 172, the light energy obtaining unit 173, and the directional tree update unit 174, refer to step S204 to step S207 in the example corresponding to FIG. 6. Details are not described herein again.

In one or more examples, the ray quantity obtaining unit 171 may include a spatial filter determining subunit 1711, a first overlapping region obtaining subunit 1712, and a node ray quantity statistical subunit 1713.

The spatial filter determining subunit 1711 is configured to obtain the spatial location, in the to-be-rendered scene, of the starting point corresponding to the probe ray in the $(N+1)^{th}$ iteration, and determine a spatial filter by using the spatial location of the starting point as a center point.

The first overlapping region obtaining subunit 1712 is configured to determine a spatial node that is in the spatial tree in the $N^{th}$ iteration and that has an intersection with the spatial filter as the first spatial node, and obtain a statistical value of a spatial overlapping region between the first spatial node and the spatial filter.

The node ray quantity statistical subunit 1713 is configured to obtain the quantity of node rays passing through the first spatial node based on a ratio of the statistical value of the spatial overlapping region to a statistical value of a spatial region of the spatial filter.

For specific functional implementations of the spatial filter determining subunit 1711, the first overlapping region obtaining subunit 1712, and the node ray quantity statistical subunit 1713, refer to step S204 in the example corresponding to FIG. 6. Details are not described herein again.

In one or more examples, the spatial tree update unit 172 includes a light path density determining subunit 1721, a spatial division subunit 1722, and a spatial node adding subunit 1723.

The light path density determining subunit 1721 is configured to determine light path density corresponding to the first spatial node based on the quantity of node rays corresponding to the first spatial node.

The spatial division subunit 1722 is configured to: in a case that the light path density corresponding to the first spatial node is greater than a density threshold, perform spatial division on the first spatial node in the spatial tree in the $N^{th}$ iteration to obtain a spatial child node corresponding to the first spatial node.

The spatial node adding subunit 1723 is configured to add the spatial child node to the spatial tree in the $N^{th}$ iteration to obtain the spatial tree in the $(N+1)^{th}$ iteration.

In some examples, the rendering apparatus 1 may further include:

a spatial node retention module 18, configured to: in a case that the light path density corresponding to the first spatial node is less than or equal to the density threshold, retain the first spatial node as a spatial leaf node in the spatial tree in the $(N+1)^{th}$ iteration.

For specific functional implementations of the light path density determining subunit 1721, the spatial division subunit 1722, the spatial node adding subunit 1723, and the spatial node retention module 18, refer to step S205 in the example corresponding to FIG. 6. Details are not described herein again.

In one or more examples, the light energy obtaining unit 173 includes a directional filter determining subunit 1731, a second overlapping region obtaining subunit 1732, and a light energy statistical subunit 1733.

The directional filter determining subunit 1731 is configured to obtain the ray direction corresponding to the probe ray in the $(N+1)^{th}$ iteration, and determine a directional filter by using the ray direction as a center point.

The second overlapping region obtaining subunit 1732 is configured to determine a directional node that is in the directional tree in the $N^{th}$ iteration and that has an intersection with the directional filter as the first directional node, and obtain a statistical value of a directional overlapping region between the first directional node and the directional filter.

The light energy statistical subunit 1733 is configured to obtain the node light energy in the first directional node based on a ratio of the statistical value of the directional overlapping region to a statistical value of a directional region of the directional filter.

For specific functional implementations of the directional filter determining subunit 1731, the second overlapping region obtaining subunit 1732, and the light energy statistical subunit 1733, refer to step S206 in the example corresponding to FIG. 6. Details are not described herein again.

In one or more examples, the directional tree update unit 174 includes an energy ratio obtaining subunit 1741, a directional division subunit 1742, and a directional node adding subunit 1743.

The energy ratio obtaining subunit 1741 is configured to obtain a directional parent node corresponding to the first directional node from the directional tree in the $N^{th}$ iteration, and obtain an energy ratio of the node light energy in the first directional node to node light energy in the directional parent node.

The directional division subunit 1742 is configured to: in case that the energy ratio is greater than an energy ratio threshold, perform directional division on the first directional node in the directional tree in the $N^{th}$ iteration to obtain a directional child node corresponding to the first directional node.

The directional node adding subunit 1743 is configured to add the directional child node to the directional tree in the $N^{th}$ iteration to obtain the directional tree in the $(N+1)^{th}$ iteration.

The rendering apparatus 1 further includes a directional node retention module 19.

The directional node retention module 19 is configured to: in a case that the energy ratio is less than or equal to the energy ratio threshold, retain the first directional node as a directional leaf node in the directional tree in the $(N+1)^{th}$ iteration.

For specific functional implementations of the energy ratio obtaining subunit 1741, the directional division subunit 1742, the directional node adding subunit 1743, and the directional node retention module 19, refer to step S207 in the example corresponding to FIG. 6. Details are not described herein again.

In this example of this application, a spatial directional tree may be built by using a GPU in a user terminal, to increase a building speed for the spatial directional tree. The spatial directional tree may be built by using a box filter (a spatial filter and a directional filter) technology based on a similarity between spatial leaf nodes and a similarity between directional leaf nodes, to reduce a quantity of samples required for building the spatial directional tree. In addition, the spatial directional tree may be adaptively divided based on light path density of a spatial leaf node and an energy ratio of a directional leaf node to a directional parent node of the directional leaf node, to improve building quality for the spatial directional tree. In a case that the spatial directional tree is applied to a light baking scene in which ray guiding is enabled, light baking quality for the scene can be improved.

Figure 15:
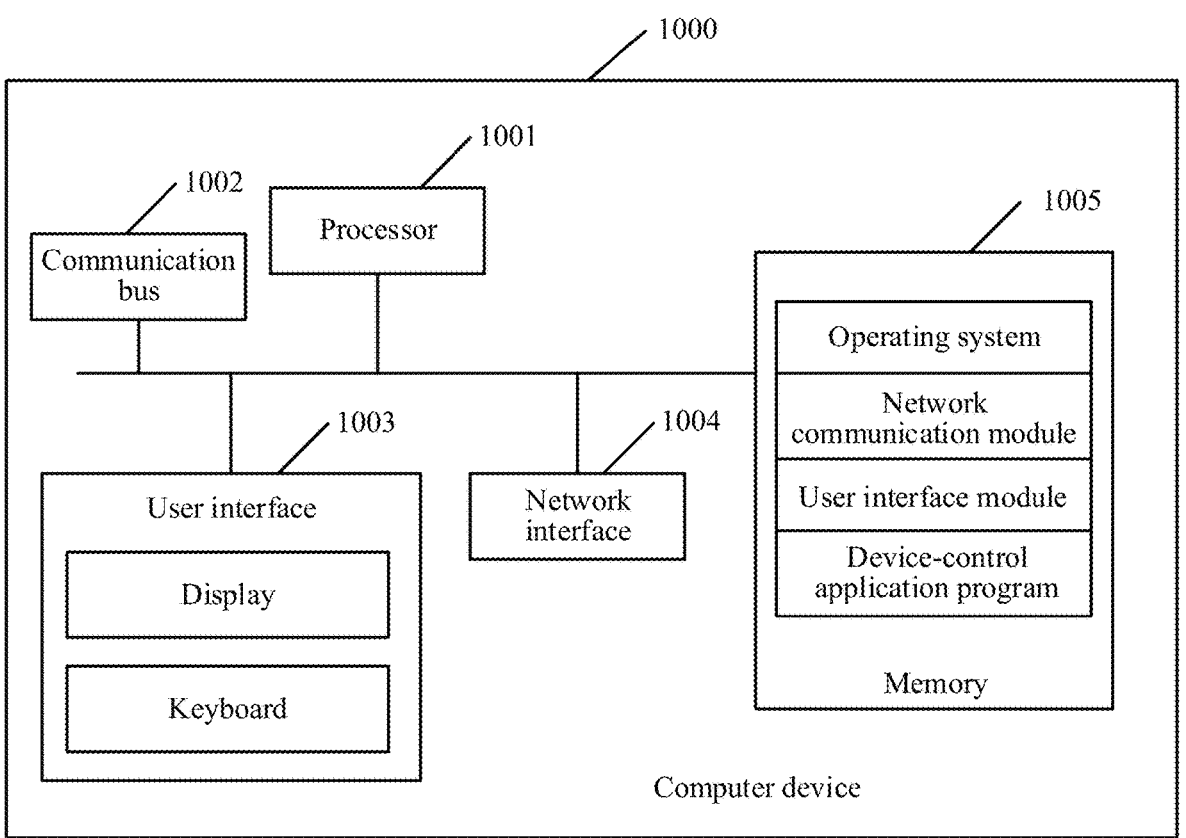
FIG. 15 is a schematic structural diagram of a computer device.

FIG. 15 is a schematic structural diagram of a computer device. As shown in FIG. 15, the computer device 1000 may be a user terminal, for example, the user terminal 10a in the example corresponding to FIG. 1, or may be a server, for example, a server 10b in the example corresponding to FIG. 1. This is not limited herein. For ease of understanding, an example in which the computer device is a user terminal is used in this application. The computer device 1000 may include a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. The user interface 1003 may further include a standard wired interface and a standard wireless interface. In some examples, the network interface 1004 may include a standard wired interface and a standard wireless interface (such as a Wi-Fi interface). The memory 1005 may be a high-speed RAM memory, or may be a non-volatile memory, for example, at least one magnetic disk memory. In some examples, the memory 1005 may alternatively be at least one storage apparatus far away from the processor 1001. As shown in FIG. 15, the memory 1005 used as a computer-readable storage medium may include an operating system, a network communication module, a user interface module, and a device-control application program.

In the computer device 1000 shown in FIG. 15, the network interface 1004 may provide a network communication function, the user interface 1003 is mainly configured to provide an input interface for a user, and the processor 1001 may be configured to invoke the device-control application program stored in the memory 1005.

In an example, the computer device 1000 may be the user terminal 10a shown in FIG. 1. The computer device may implement the following operations through the processor 1001:

obtaining a texture element x in a to-be-rendered scene, and obtaining a target spatial directional tree corresponding to the to-be-rendered scene, the target spatial directional tree being used for representing ray guiding distribution corresponding to a texture element in the to-be-rendered scene, and x being a positive integer;

obtaining, from the target spatial directional tree, a scene spatial region to which the texture element x belongs, and obtaining incident ray distribution corresponding to the texture element x based on a quantity of light paths and light energy in the scene spatial region; and determining a light rendering result corresponding to the texture element x based on an incident ray corresponding to the incident ray distribution.

It is to be understood that the computer device 1000 described may perform the descriptions of the rendering method in the example corresponding to any one of FIG. 3, FIG. 6, and FIG. 10, or may perform the descriptions of the rendering apparatus 1 in the example corresponding to FIG. 14. Details are not described herein again. In addition, the description of beneficial effects of the same method are not described herein again.

In addition, an example of this application further provides a computer-readable storage medium. The computer-readable storage medium stores a computer program to be executed by the rendering apparatus 1 and the rendering apparatus 2, and the computer program includes program instructions. When the program instructions are executed by a processor, the descriptions of the rendering method in the example corresponding to any one of FIG. 3, FIG. 6, and FIG. 10 can be performed. Therefore, details are not described herein again. In addition, the description of beneficial effects of the same method are not described herein again. For technical details that are not disclosed in the computer-readable storage medium examples of this application, refer to the descriptions of the method examples of this application. In an example, program instructions may be deployed on one computing device for execution, or may be executed on a plurality of computing devices in one location, or may be executed on a plurality of computing devices that are distributed in a plurality of locations and that are interconnected through a communication network. The plurality of computing devices that are distributed in a plurality of locations and that are interconnected through a communication network may form a blockchain system.

In addition, an example of this application further provides a computer program product or a computer program, where the computer program product or the computer program may include computer instructions, and the computer instructions may be stored in a computer-readable storage medium. A processor of a computer device reads the computer instructions from the computer-readable storage medium, and the processor may execute the computer instructions, so that the computer device performs the descriptions of the rendering method in the example corresponding to any one of FIG. 3, FIG. 6, and FIG. 10. Therefore, details are not described herein again. In addition, the description of beneficial effects of the same method are not described herein again. For technical details that are not disclosed in the computer program product or computer program examples of this application, refer to the descriptions of the method examples of this application.

To simplify the description, the foregoing method examples are described as a series of action combination. But a person of ordinary skill in the art is to know that this application is not limited to any described sequence of the action, as some steps can adopt other sequences or can be executed simultaneously according to this application. In addition, a person skilled in the art is also to know that all the examples described in the specification may be preferred examples, and the related actions and modules are not necessarily mandatory to this application.

The steps of the methods in the examples of this application may be reordered, combined, or deleted according to an actual requirement.

The modules of the apparatuses in the examples of this application may be combined, divided, or deleted according to an actual requirement.

A person of ordinary skill in the art may understand that all or some of the processes of the methods in the foregoing examples may be implemented by a computer program instructing relevant hardware. The computer program may be stored in a computer-readable storage medium. When the program is run, the processes in the foregoing method examples may be included. The storage medium may be a magnetic disk, an optical disc, a read-only memory (ROM), a random access memory (RAM), or the like.

What is disclosed above is merely examples of this application, and certainly is not intended to limit the scope of the claims of this application. Therefore, equivalent variations made in accordance with the claims of this application shall fall within the scope of this application.

What is claimed is:

1. A method comprising:

determining, by a computing device, a texture element in a to-be-rendered scene;

determining a target spatial directional tree corresponding to the to-be-rendered scene, wherein the target spatial directional tree represents an incident ray distribution corresponding to the texture element in the to-be-rendered scene;

determining, based on the target spatial directional tree, a scene spatial region for the texture element;

determining, based on a quantity of light paths in the scene spatial region, light energy in a ray direction corresponding to the texture element;

determining the incident ray distribution corresponding to the texture element based on the quantity of light paths in the scene spatial region and the light energy; and determining a light rendering result corresponding to the texture element based on an incident ray corresponding to the incident ray distribution.

2. The method according to claim 1, wherein the determining the target spatial directional tree comprises:

determining a probe ray for the to-be-rendered scene in an $N^{th}$ iteration;

building a spatial directional tree in the $N^{th}$ iteration based on a starting point corresponding to the probe ray in the $N^{th}$ iteration and light energy corresponding to the probe ray in the $N^{th}$ iteration;

generating a probe ray for the to-be-rendered scene in an $(N+1)^{th}$ iteration based on the spatial directional tree in the $N^{th}$ iteration;

building a spatial directional tree in the $(N+1)^{th}$ iteration based on a starting point corresponding to the probe ray in the $(N+1)^{th}$ iteration and light energy corresponding to the probe ray in the $(N+1)^{th}$ iteration; and determining the spatial directional tree in the $(N+1)^{th}$ iteration as the target spatial directional tree.

3. The method according to claim 2, wherein the spatial directional tree in the $N^{th}$ iteration comprises a spatial tree in the $N^{th}$ iteration and a directional tree in the $N^{th}$ iteration, the spatial tree in the $N^{th}$ iteration represents a spatial division result for the to-be-rendered scene in the $N^{th}$ iteration, and the directional tree in the $N^{th}$ iteration represents a ray directional division result for the to-be-rendered scene in the $N^{th}$ iteration; and the building the spatial directional tree in the $(N+1)^{th}$ iteration comprises:

determining a first spatial node associated with the starting point from the spatial tree in the $N^{th}$ iteration based on a spatial location, in the to-be-rendered scene, of the starting point corresponding to the probe ray in the $(N+1)^{th}$ iteration, and obtaining a quantity of node rays passing through the first spatial node;

updating the spatial tree in the $N^{th}$ iteration based on the quantity of node rays corresponding to the first spatial node to obtain a spatial tree in the $(N+1)^{th}$ iteration;

determining a first directional node associated with the probe ray in the $(N+1)^{th}$ iteration from the directional tree in the $N^{th}$ iteration based on a ray direction corresponding to the probe ray in the $(N+1)^{th}$ iteration, and obtaining node light energy in the first directional node based on the light energy corresponding to the probe ray in the $(N+1)^{th}$ iteration; and updating the directional tree in the $N^{th}$ iteration based on the node light energy in the first directional node to obtain a directional tree in the $(N+1)^{th}$ iteration, and wherein the determining the spatial directional tree in the $(N+1)^{th}$ iteration as the target spatial directional tree comprises determining the spatial tree in the $(N+1)^{th}$ iteration and the directional tree in the $(N+1)^{th}$ iteration as the target spatial directional tree.

4. The method according to claim 3, wherein the determining the first spatial node comprises:

obtaining the spatial location, in the to-be-rendered scene, of the starting point corresponding to the probe ray in the $(N+1)^{th}$ iteration, and determining a spatial filter by using the spatial location of the starting point as a center point; and determining a spatial node that is in the spatial tree in the $N^{th}$ iteration and that has an intersection with the spatial filter as the first spatial node, and obtaining a statistical value of a spatial overlapping region between the first spatial node and the spatial filter; and wherein the obtaining the quantity of node rays comprises obtaining the quantity of node rays passing through the first spatial node based on a ratio of the statistical value of the spatial overlapping region to a statistical value of a spatial region of the spatial filter.

5. The method according to claim 3, wherein the updating the spatial tree comprises:

determining a light path density corresponding to the first spatial node based on the quantity of node rays corresponding to the first spatial node;

based on a determination that the light path density corresponding to the first spatial node is greater than a density threshold, performing spatial division on the first spatial node in the spatial tree in the $N^{th}$ iteration to obtain a spatial child node corresponding to the first spatial node; and adding the spatial child node to the spatial tree in the $N^{th}$ iteration to obtain the spatial tree in the $(N+1)^{th}$ iteration.

6. The method according to claim 5, further comprising: based on a determination that the light path density corresponding to the first spatial node is less than or equal to the density threshold, retaining the first spatial node as a spatial leaf node in the spatial tree in the $(N+1)^{th}$ iteration.

7. The method according to claim 3, wherein the determining the first directional node and obtaining the node light energy comprises:

obtaining the ray direction corresponding to the probe ray in the $(N+1)^{th}$ iteration, and determining a directional filter by using the ray direction as a center point;

determining a directional node that is in the directional tree in the $N^{th}$ iteration and that has an intersection with the directional filter as the first directional node, and obtaining a statistical value of a directional overlapping region between the first directional node and the directional filter; and obtaining the node light energy in the first directional node based on a ratio of the statistical value of the directional overlapping region to a statistical value of a directional region of the directional filter.

8. The method according to claim 3, wherein the updating the directional tree comprises:

obtaining a directional parent node corresponding to the first directional node from the directional tree in the $N^{th}$ iteration, and obtaining an energy ratio of the node light energy in the first directional node to node light energy in the directional parent node;

based on a determination that the energy ratio is greater than an energy ratio threshold, performing directional division on the first directional node in the directional tree in the $N^{th}$ iteration to obtain a directional child node corresponding to the first directional node; and adding the directional child node to the directional tree in the $N^{th}$ iteration to obtain the directional tree in the $(N+1)^{th}$ iteration.

9. The method according to claim 8, further comprising: based on a determination that the energy ratio is less than or equal to the energy ratio threshold, retaining the first directional node as a directional leaf node in the directional tree in the $(N+1)^{th}$ iteration.

10. The method according to claim 1, wherein the target spatial directional tree comprises a target spatial tree and a target directional tree, the target spatial tree represents a spatial division result for the to-be-rendered scene, and the target directional tree represents a ray directional division result for the to-be-rendered scene.

11. The method according to claim 10, wherein the determining the scene spatial region comprises:

traversing spatial nodes in the target spatial tree, obtaining a second spatial node matching the texture element from the target spatial tree, and determining a spatial region corresponding to the second spatial node as the scene spatial region; and obtaining the quantity of light paths in the scene spatial region, and obtaining a second directional node matching the texture element from a target directional tree corresponding to the second spatial node; and wherein the determining the incident ray distribution comprises determining the incident ray distribution corresponding to the texture element based on the quantity of light paths and light energy corresponding to the second directional node.

12. The method according to claim 1, wherein the determining the light rendering result comprises:

obtaining the incident ray corresponding to the texture element based on the incident ray distribution, and determining a ray attenuation parameter corresponding to the texture element based on an included angle between the incident ray and a normal corresponding to the texture element; and obtaining incident radiosity and a reflection proportion corresponding to the incident ray, and performing an integral operation on a product of the incident radiosity, the reflection proportion, and the ray attenuation parameter to obtain the light rendering result corresponding to the texture element.

13. An apparatus, comprising:

one or more processors; and memory storing instructions that, when executed by the one or more processors, configure the apparatus to:

determine a texture element in a to-be-rendered scene;

determine a target spatial directional tree corresponding to the to-be-rendered scene, wherein the target spatial directional tree represents an incident ray distribution corresponding to the texture element in the to-be-rendered scene;

determine, based on the target spatial directional tree, a scene spatial region for the texture element;

determine, based on a quantity of light paths in the scene spatial region, light energy in a ray direction corresponding to the texture element;

determine the incident ray distribution corresponding to the texture element based on the quantity of light paths in the scene spatial region and the light energy; and determine a light rendering result corresponding to the texture element based on an incident ray corresponding to the incident ray distribution.

14. The apparatus according to claim 13, wherein the instructions, when executed by the one or more processors, configure the apparatus to determine the target spatial directional tree by: determining a probe ray for the to-be-rendered scene in an $N^{th}$ iteration;

building a spatial directional tree in the $N^{th}$ iteration based on a starting point corresponding to the probe ray in the $N^{th}$ iteration and light energy corresponding to the probe ray in the $N^{th}$ iteration;

generating a probe ray for the to-be-rendered scene in an $(N+1)^{th}$ iteration based on the spatial directional tree in the $N^{th}$ iteration;

building a spatial directional tree in the $(N+1)^{th}$ iteration based on a starting point corresponding to the probe ray in the $(N+1)^{th}$ iteration and light energy corresponding to the probe ray in the $(N+1)^{th}$ iteration; and determining the spatial directional tree in the $(N+1)^{th}$ iteration as the target spatial directional tree.

15. The apparatus according to claim 14, wherein the spatial directional tree in the $N^{th}$ iteration comprises a spatial tree in the $N^{th}$ iteration and a directional tree in the $N^{th}$ iteration, the spatial tree in the $N^{th}$ iteration represents a spatial division result for the to-be-rendered scene in the $N^{th}$ iteration, and the directional tree in the $N^{th}$ iteration represents a ray directional division result for the to-be-rendered scene in the $N^{th}$ iteration; and wherein the instructions, when executed by the one or more processors, configure the apparatus to build the spatial directional tree in the $(N+1)^{th}$ iteration by determining a first spatial node associated with the starting point from the spatial tree in the $N^{th}$ iteration based on a spatial location, in the to-be-rendered scene, of the starting point corresponding to the probe ray in the $(N+1)^{th}$ iteration, and obtain a quantity of node rays passing through the first spatial node;

updating the spatial tree in the $N^{th}$ iteration based on the quantity of node rays corresponding to the first spatial node to obtain a spatial tree in the $(N+1)^{th}$ iteration;

determining a first directional node associated with the probe ray in the (N+1)th iteration from the directional tree in the $N^{th}$ iteration based on a ray direction corresponding to the probe ray in the $(N+1)^{th}$ iteration, and obtain node light energy in the first directional node based on the light energy corresponding to the probe ray in the $(N+1)^{th}$ iteration; and updating the directional tree in the $N^{th}$ iteration based on the node light energy in the first directional node to obtain a directional tree in the $(N+1)^{th}$ iteration, and wherein the instructions, when executed by the one or more processors, configure the apparatus to determine the spatial directional tree in the $(N+1)^{th}$ iteration as the target spatial directional tree by determining the spatial tree in the $(N+1)^{th}$ iteration and the directional tree in the $(N+1)^{th}$ iteration as the target spatial directional tree.

16. The apparatus according to claim 15, wherein the instructions, when executed by the one or more processors, configure the apparatus to determine the first spatial node by:

obtaining the spatial location, in the to-be-rendered scene, of the starting point corresponding to the probe ray in the $(N+1)^{th}$ iteration, and determining a spatial filter by using the spatial location of the starting point as a center point; and determining a spatial node that is in the spatial tree in the $N^{th}$ iteration and that has an intersection with the spatial filter as the first spatial node, and obtain a statistical value of a spatial overlapping region between the first spatial node and the spatial filter; and wherein the instructions, when executed by the one or more processors, configure the apparatus to obtain the quantity of node rays by obtaining the quantity of node rays passing through the first spatial node based on a ratio of the statistical value of the spatial overlapping region to a statistical value of a spatial region of the spatial filter.

17. The apparatus according to claim 15, wherein the instructions, when executed by the one or more processors, configure the apparatus to update the spatial tree by:

determining light path density corresponding to the first spatial node based on the quantity of node rays corresponding to the first spatial node;

based on a determination that the light path density corresponding to the first spatial node is greater than a density threshold, performing spatial division on the first spatial node in the spatial tree in the $N^{th}$ iteration to obtain a spatial child node corresponding to the first spatial node; and adding the spatial child node to the spatial tree in the $N^{th}$ iteration to obtain the spatial tree in the $(N+1)^{th}$ iteration.

18. The apparatus according to claim 17, wherein the instructions, when executed by the one or more processors, configure the apparatus to:

based on a determination that the light path density corresponding to the first spatial node is less than or equal to the density threshold, retain the first spatial node as a spatial leaf node in the spatial tree in the $(N+1)^{th}$ iteration.

19. The apparatus according to claim 15, wherein the instructions, when executed by the one or more processors, configure the apparatus to determine the first directional node and obtain the node light energy by:

obtaining the ray direction corresponding to the probe ray in the $(N+1)^{th}$ iteration, and determining a directional filter by using the ray direction as a center point;

determining a directional node that is in the directional tree in the $N^{th}$ iteration and that has an intersection with the directional filter as the first directional node, and obtaining a statistical value of a directional overlapping region between the first directional node and the directional filter; and obtaining the node light energy in the first directional node based on a ratio of the statistical value of the directional overlapping region to a statistical value of a directional region of the directional filter.

20. One or more non-transitory computer-readable media, when executed, cause:

determining, by a computing device, a texture element in a to-be-rendered scene;

determining a target spatial directional tree corresponding to the to-be-rendered scene, wherein the target spatial directional tree represents an incident ray distribution corresponding to the texture element in the to-be-rendered scene;

determining, based on the target spatial directional tree, a scene spatial region for the texture element;

determine, based on a quantity of light paths in the scene spatial region, light energy in a ray direction corresponding to the texture element;

determining the incident ray distribution corresponding to the texture element based on the quantity of light paths in the scene spatial region and the light energy; and determining a light rendering result corresponding to the texture element based on an incident ray corresponding to the incident ray distribution.

\* \* \* \* \*